(12) United States Patent
Yun et al.

(10) Patent No.: US 10,042,391 B2
(45) Date of Patent: Aug. 7, 2018

(54) ELECTRONIC DEVICE WITH FOLDABLE DISPLAY AND METHOD OF OPERATING THE SAME

(71) Applicant: Samsung Electronics Co., Ltd., Gyeonggi-do (KR)

(72) Inventors: Yongsang Yun, Gyeonggi-do (KR); Soyoung Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 100 days.

(21) Appl. No.: 14/721,192

(22) Filed: May 26, 2015

(65) Prior Publication Data
US 2015/0338882 A1 Nov. 26, 2015

(30) Foreign Application Priority Data
May 26, 2014 (KR) .................. 10-2014-0063086

(51) Int. Cl.
| | |
|---|---|
| *G06F 3/041* | (2006.01) |
| *G06F 1/16* | (2006.01) |
| *G06F 3/0488* | (2013.01) |
| *G06F 3/0487* | (2013.01) |
| *G06F 3/01* | (2006.01) |

(Continued)

(52) U.S. Cl.
CPC .......... *G06F 1/1641* (2013.01); *G06F 1/1626* (2013.01); *G06F 1/1677* (2013.01); *G06F 3/017* (2013.01); *G06F 3/0383* (2013.01); *G06F 3/03545* (2013.01); *G06F 3/0487* (2013.01); *G06F 3/0488* (2013.01); *G06F 3/04883* (2013.01); *G06F 3/04886* (2013.01); *G06F 2203/04804* (2013.01); *G06F 2203/04805* (2013.01); *G06F 2203/04806* (2013.01)

(58) Field of Classification Search
USPC ............... 345/156, 173, 174, 179, 660, 697; 349/12; 715/766, 771, 854
See application file for complete search history.

(56) References Cited

U.S. PATENT DOCUMENTS

| | | |
|---|---|---|
| 2006/0125784 A1 | 6/2006 | Jang et al. |
| 2010/0064244 A1 | 3/2010 | Kilpatrick, II et al. |

(Continued)

FOREIGN PATENT DOCUMENTS

| | | |
|---|---|---|
| EP | 1 426 597 A1 | 6/2004 |
| JP | 10-207389 A | 8/1998 |

(Continued)

OTHER PUBLICATIONS

Khalilbeigi, et al.; "FoldMe; Interacting with Double-sided Foldable Displays"; Feb. 19-22, 2012; Association for Computing Machinery, Inc.

*Primary Examiner* — Thuy Pardo
(74) *Attorney, Agent, or Firm* — Cha & Reiter, LLC.

(57) ABSTRACT

The present disclosure provides a method of operating an electronic device having a foldable display by displaying information on a screen of the foldable display, determining that the screen is folded into a plurality of layers, altering an attribute of the information in response to the determining that the screen is folded into the plurality of layers; and displaying the information with the altered attribute on the screen being folded into the plurality of layers.

19 Claims, 20 Drawing Sheets

(51) Int. Cl.
*G06F 3/038* (2013.01)
*G06F 3/0354* (2013.01)

(56) References Cited

U.S. PATENT DOCUMENTS

| | | | |
|---|---|---|---|
| 2010/0229113 A1* | 9/2010 | Conner | G06Q 10/10 715/771 |
| 2012/0060089 A1 | 3/2012 | Heo et al. | |
| 2012/0105487 A1 | 5/2012 | Son et al. | |
| 2012/0139815 A1 | 6/2012 | Aono et al. | |
| 2012/0293553 A1* | 11/2012 | Lee | G06F 3/0482 345/660 |
| 2013/0009891 A1* | 1/2013 | Watanabe | G06F 3/0488 345/173 |
| 2014/0015782 A1* | 1/2014 | Kim | G06F 3/04883 345/173 |
| 2014/0015872 A1* | 1/2014 | Yamauchi | G09G 3/2022 345/697 |
| 2014/0035942 A1* | 2/2014 | Yun | G09G 5/006 345/592 |
| 2014/0049464 A1* | 2/2014 | Kwak | G06F 3/0487 345/156 |
| 2014/0101575 A1 | 4/2014 | Kwak et al. | |
| 2014/0208248 A1* | 7/2014 | Davidson | G06F 3/0487 715/766 |
| 2014/0210753 A1* | 7/2014 | Lee | G06F 3/0484 345/173 |
| 2014/0240289 A1* | 8/2014 | Myers | H04M 1/0268 345/174 |
| 2014/0313432 A1* | 10/2014 | Kasugai | G06F 1/1643 349/12 |
| 2015/0046883 A1* | 2/2015 | Yoo | G06F 3/04842 715/854 |
| 2015/0185983 A1* | 7/2015 | Yang | G06F 3/03547 345/173 |

FOREIGN PATENT DOCUMENTS

| | | |
|---|---|---|
| JP | 2006-174435 A | 6/2006 |
| KR | 10-2010-0050318 A | 5/2010 |

* cited by examiner

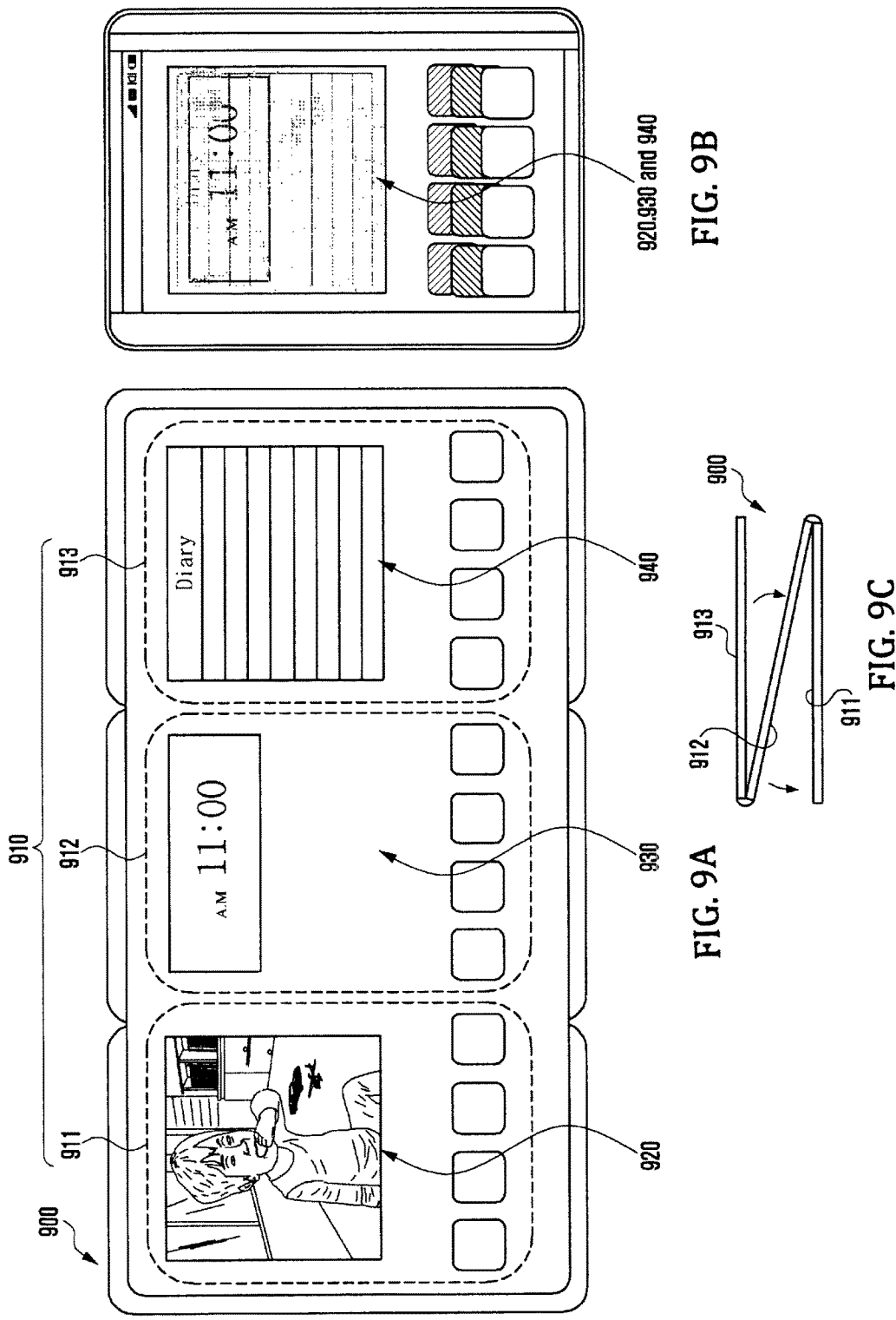

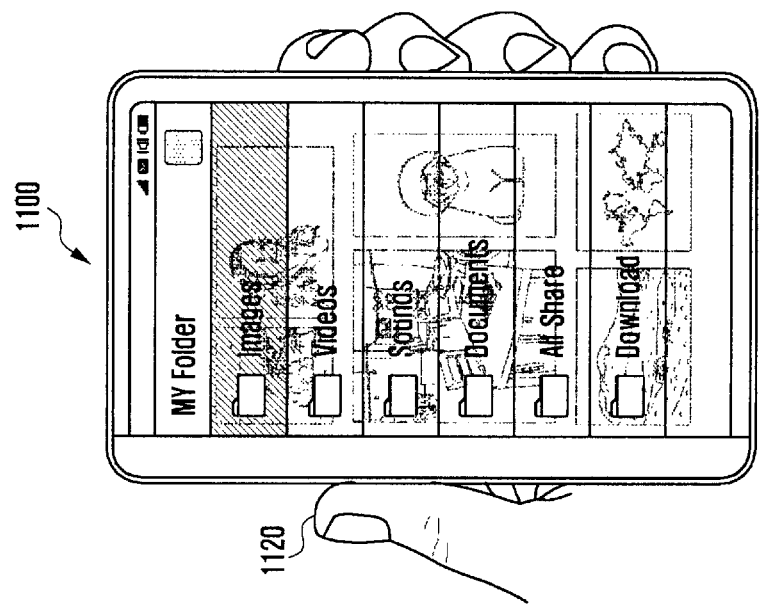
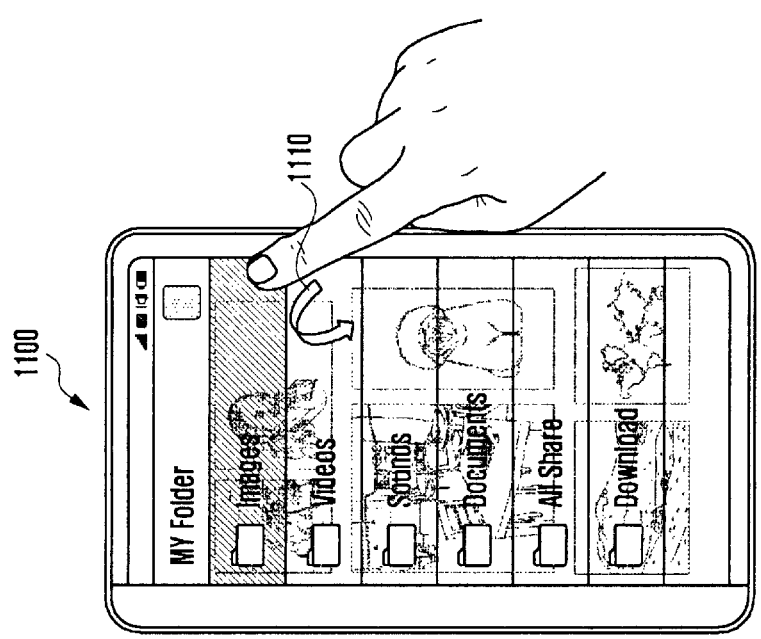
FIG. 11A
FIG. 11B

ELECTRONIC DEVICE WITH FOLDABLE DISPLAY AND METHOD OF OPERATING THE SAME

CLAIM OF PRIORITY

This application claims the benefit under 35 U.S.C. § 119(a) of a Korean patent application filed on May 26, 2014 in the Korean Intellectual Property Office and assigned Serial No. 10-2014-0063086, the entire disclosure of which is hereby incorporated by reference.

BACKGROUND

1. Field of the Disclosure

The present disclosure relate to electronic devices having a foldable display.

2. Description of the Related Art

Electronic devices such as smart phones, tablet PCs, etc. may include a transparent display. A transparent display allows the user to see what is displayed on one side (e.g., the front) and the other side (e.g., the rear) so that an object on the rear side is projected to the front side for viewing. Further, a user can see his/her hand projected to the transparent display on which an image is displayed. Transparent displays typically feature a see-through rear side as described above and are implemented by various technologies.

A portable electronic device may be equipped with a touch screen including a transparent display, a front touch panel for detecting touches input onto the front side of the transparent display, and a rear touch panel for detecting touches input onto the rear side of the transparent display. Users can make readily inputs to the portable electronic device through the front and rear sides of the touch screen.

Electronic devices may also be equipped with a foldable display allowing the screen to be folded in a plurality of parts or layers. Foldable display may be flexible displays, such as, for example, those implemented in such a way that glass plates of LCD or OLED, containing liquid crystal, are replaced with plastic films, so that flexibility to be folded or unfolded is allowed. Foldable displays are conventionally different from flexible displays in type and may include a plurality of hard-type displays and a hinge unit coupling the hard-type displays to each other, allowing the user to fold or unfold the hard-type displays.

SUMMARY

The present disclosure describes, in general, a method of operating an electronic device having a foldable display, the method comprising displaying information on a screen of the foldable display, determining that the screen is folded into a plurality of layers, altering an attribute of the information in response to the determining that the screen is folded into the plurality of layers; and displaying the information with the altered attribute on the screen being folded into the plurality of layers.

In accordance with another exemplary embodiment of the present disclosure, the present disclosure provides an electronic device including: a foldable display at least part of which is transparent; a sensor unit: and a processor for: determining that the screen is folded into a plurality of layers based upon information received from the sensor unit; alter an attribute of the information in response to the determining that the screen in folded into the plurality of layers; and display the information with the altered attribute on the screen being folded into the plurality of the layers.

BRIEF DESCRIPTION OF THE DRAWINGS

The features and advantages of the disclosure will become more apparent from the following detailed description in conjunction with the accompanying drawings, in which:

FIG. 9A, FIG. 9B and FIG. 9C illustrate views that describe an example of 'a process of altering information attribute' in an electronic device according to the present disclosure;

FIG. 11A and FIG. 11B illustrate views that describe a first example of a process of setting an input area in an electronic device according to the present disclosure;

DETAILED DESCRIPTION

Figure 1:
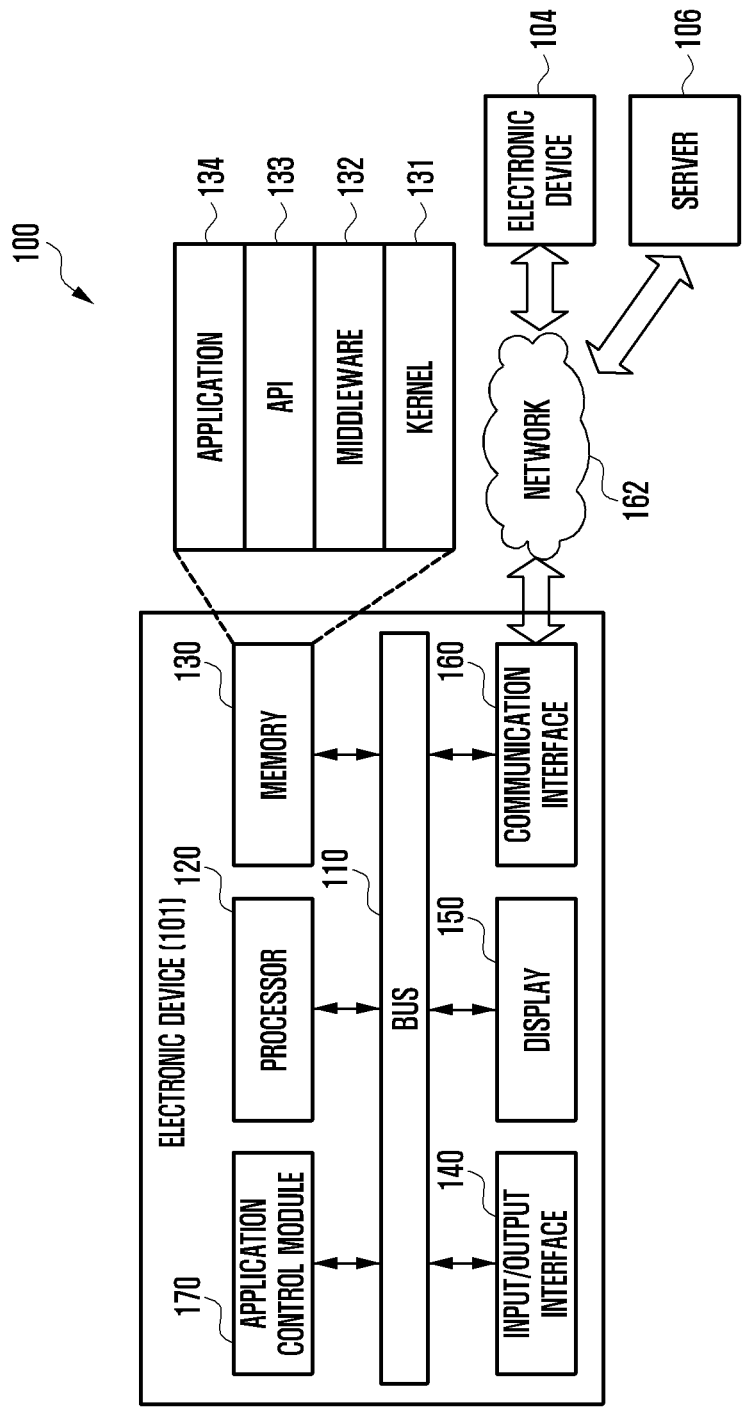
FIG. 1 is a network environment including an electronic device according to embodiments of the present disclosure.

Hereinafter, the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, and such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. In contrast, for example, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet personal computer (PC), a mobile phone, any duplex system, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, a smartwatch, and the like).

According to some embodiments, the electronic device may be a smart home appliance with a communication function. The smart home appliance as the electronic device, for example, may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung. HomeSync™, Apple TV™, or Google TV™), a game console, an electronic dictionary, an electronic key, a camcorder, an electronic photo frame, and the like.

According to some embodiments, the electronic devices may include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, a point of sales (POS) terminal in a shop, and the like.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, the electronic device according to the present disclosure may be a flexible device. Further, the electronic device according to the present disclosure is not limited to the aforementioned devices.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

FIG. 1 illustrates a network environment 100 including an electronic device 101 according to various embodiments of the present disclosure. Referring now to FIG. 1, the electronic device 101 may include a bus 110, a processor 120, a tangible, non-transitory, computer-readable memory (or "memory") 130, an input/output interface 140, a display 150, a communication interface 160, and/or an application control module 170.

The bus 110 may be a circuit interconnecting the aforementioned components and transmitting communication (e.g., a control message) between the aforementioned components.

The processor 120, for example, may receive instructions from the aforementioned components (e.g., the memory 130, the input/output interface 140, the display 150, the communication interface 160, and the application control module 170) other than the processor 120 through the bus 110, decode the received instructions, and perform operations or data processing according to the decoded instructions.

The memory 130 may store instructions or data received from or generated by the processor 120 or other components (e.g., the input/output interface 140, the display 150, the communication interface 160, and the application control module 170). The memory 130 may include programming modules, for example, a kernel 131, middleware 132, an application programming interface (API) 133, and applications 134. Each of the programming modules as described above may be formed by software, firmware, hardware, or a combination of two or more thereof.

The kernel 131 may control or manage system resources (e.g., the bus 110, the processor 120, and the memory 130) used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 may serve to mediate between the API 133 or the applications 134 and the kernel 131, that is, allow the API 133 or the application 134 to communicate and exchange data with the kernel 131. Further, the middleware 132 may perform control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

According to various embodiments, the applications 134 may include an SMS/MMS application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments, the applications 134 may include an application specified according to the attribute (e.g., type) of an external electronic device (e.g., the electronic device 104). For example, when the external electronic device is an MP3 player, the applications 134 may include an application associated with music playback. Similarly, when the external electronic device is a mobile medical device, the applications 134 may include health care related application(s). According to an embodiment, the applications 134 may include at least one of an application assigned to the electronic device 101 and an application received from an external electronic device (e.g., the server 106 or the electronic device 104).

The input/output interface 140, for example, may transfer instructions or data, input from a user through an input/output device (e.g., a sensor, a keyboard, or a touch screen), to the processor 120, the memory 130, the communication interface 160, or the application control module 170 through the bus 110. For example, the input/output interface 140 may provide the processor 120 with data corresponding to a user's touch input through a touch screen. Further, the input/output interface 140 may, for example, receive instructions or data from the processor 120, the memory 130, the communication interface 160, or the application control module 170 through the bus 110 and output the received instructions or data through the input/output device (e.g., a speaker or a display). For example, the input/output interface 140 may output voice data processed by the processor 120 to a user through a speaker.

The display 150 may display various pieces of information (e.g., multimedia data or text data) to a user.

The communication interface 160 may establish communication between the electronic device 101 and an external electronic device (e.g., the electronic device 104 or the server 106). For example, the communication interface 160 may be connected to the network 162 through wireless or wired communication for communication with the external device. The wireless communication, for example, may include at least one of wireless fidelity (WiFi), Bluetooth (BT), near field communication (NFC), a global positioning system (GPS), and cellular communication (e.g., LTE, LTE-A, CDMA, CDMA, UMTS, WiBro, or GSM). The wired communication, for example, may include at least one of a universal serial bus (USB), a high definition multimedia interface (HDMI), recommended standard 232 (RS-232), and a plain old telephone service (POTS).

According to various embodiments, the network 162 may be a telecommunications network, which may include at least one of a computer network, the Internet, the Internet of things, and a telephone network. According to various embodiments, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

The application control module 170 may process at least some pieces of information acquired from other components (e.g., the processor 120, the memory 130, the input/output interface 140, and the communication interface 160) and provide the processed information to a user in various ways. For example, the application control module 170 may recognize information on connection components provided in the electronic device 101, store the information on connection components in the memory 130, and execute the applications 130, based on the stored information on connection components. Further, information of the application control module 170 will be provided below with reference to FIGS. 2 to 9.

Figure 2:
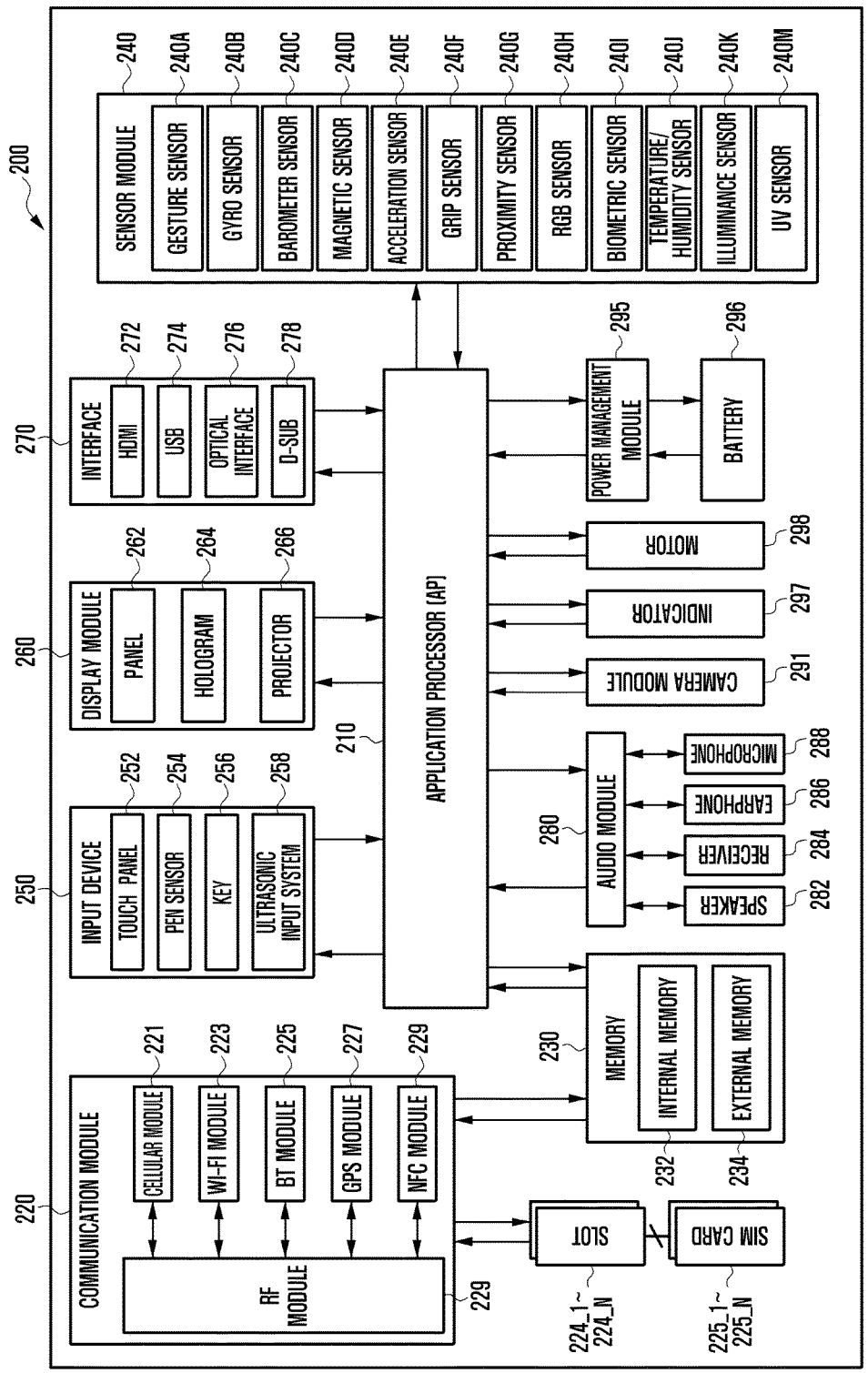
FIG. 2 is a schematic block diagram of an electronic device according to embodiments of the present disclosure.

FIG. 2 illustrates a block diagram of an electronic device according to various embodiments. The electronic device 200, for example, may constitute all or a part of the electronic device 101 shown in FIG. 1. Referring to FIG. 2, the electronic device 200 may include at least one application processor (AP) 210, a communication module 220, at least one subscriber identity module (SIM) card slots 224_1~224_N, a memory 230, a sensor module 240, an input module 250, a display 260, an interface 270, an audio module 280, a camera module 291, a power management module 295, a battery 296, an indicator 297, and a motor 298.

The AP 210 may drive an operating system or an application program to control a plurality of hardware or software components connected to the AP 210, and may perform processing and operations of various data including multimedia data. The AP 210, for example, may be implemented as a system on chip (SoC). According to various embodiments, the AP 210 may further include a graphic processing unit (GPU) (not shown).

The communication module 220 (e.g., the communication interface 160) may perform data transmission/reception in communication with other electronic devices (e.g., the electronic device 104 and the server 106) connected to the electronic device 200 (e.g., the electronic device 101) through a network. According to an embodiment, the communication module 220 may include a cellular module 221, a WiFi module 223, a BT module 225, a GPS module 227, an NFC module 228, and a radio frequency (RF) module 229.

The cellular module 221 may provide a voice call, a video call, an SMS service, an Internet service, and the like through a communication network (e.g., LTE, LTE-A, CDMA, WCDMA, UMTS, WiBro, or GSM). Also, the cellular module 221 may identify and authenticate an electronic device in a communication network by using, for example, a subscriber identification module (e.g., the SIM card). According to various embodiments, the cellular module 221 may perform at least some of the functions that may be provided by the AP 210. For example, the cellular module 221 may perform at least a multimedia control function.

According to various embodiments, the cellular module 221 may include a communication processor (CP). Further, the cellular module 221, for example, may be implemented as a SoC. Although the cellular module 221 (e.g., a CP), the memory 230, the power management module 295, and the like are shown as separate elements from the AP 210 in FIG. 2, the AP 210 may be implemented to include at least some (e.g., the cellular module 221) of the aforementioned elements according to an embodiment.

According to various embodiments, the AP 210 or the cellular module 221 (e.g., a CP) may load a command or data received from at least one of a non-volatile memory and other elements connected thereto into a volatile memory and process the loaded command or data. Further, the AP 210 or the cellular module 221 may store data received from or generated by at least one of other elements in a non-volatile memory.

Each of the WiFi module 223, the BT module 225, the GPS module 227, and the NFC module 228, for example, may include a processor for processing data transmitted or received through the corresponding module. Although the cellular module 221, the WiFi module 223, the BT module 225, the GPS module 227, and the NFC module 228 are shown as separate blocks in FIG. 2, at least some (e.g., two or more) of the cellular module 221, the WiFi module 223, the BT module 225, the GPS module 227, and the NFC module 228 may be included in one integrated chip (IC) or one IC package according to an embodiment. For example, at least some of processors corresponding to the cellular module 221, the WiFi module 223, the BT module 225, the GPS module 227, and the NFC module 228 respectively (e.g., a CP corresponding to the cellular module 221 and a WiFi processor corresponding to the WiFi module 223) may be implemented as one SoC.

The RF module 229 may perform data transmission/reception, for example, RF signal transmission/reception. Although not shown in the drawing, the RF module 229, for example, may include a transceiver, a power amp module (PAM), a frequency filter, a low noise amplifier (LNA), and the like. Also, the RF module 229 may further include a component for transmitting/receiving an electromagnetic wave over the air in wireless communication, such as a conductor or a conducting wire. Although FIG. 2 shows that the cellular module 221, the WiFi module 223, the BT module 225, the GPS module 227, and the NFC module 228 share one RF module 229, at least one of the cellular module 221, the WiFi module 223, the BT module 225, the GPS module 227, and the NFC module 228 may perform RF signal transmission/reception through a separate RF module according to an embodiment.

Here, at least one SIM card 225_1 to 225_N may be a card including a subscriber identification module, and may be inserted into at least one slot 224_1 to 224_N formed in a certain position of the electronic device. The at least one SIM card 225_1 to 225_N may include unique identification information (e.g., integrated circuit card identifier (ICCID)) or subscriber information (e.g., international mobile subscriber identity (IMSI)).

The memory 230 (e.g., the memory 130) may include an internal memory 232 or an external memory 234. The internal memory 232, for example, may include at least one of a volatile memory (e.g., a dynamic RAM (DRAM), a static RAM (SRAM), or a synchronous dynamic RAM (SDRAM)) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or an NOR flash memory).

According to an embodiment, the internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 may measure a physical quantity or detect an operation state of the electronic device 200 and convert the measured or detected information into an electronic signal. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, a light sensor 240K, and a ultraviolet (UV) sensor 240M. Additionally or alternatively, the sensor module 240, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 240 may further include a control circuit for controlling one or more sensors included therein.

The input module 250 may include a touch panel 252, a (digital) pen sensor 254, a key 256, or an ultrasonic input unit 258. The touch panel 252 that recognizes a touch input, for example, may include at least one of a capacitive touch panel, a resistive touch panel, an infrared touch panel, and an acoustic wave touch panel. Also, the touch panel 252 may further include a control circuit. When the touch panel is a capacitive touch panel, it may recognize a physical contact or proximity. The touch panel 252 may also further include a tactile layer. In this case, the touch panel 252 may provide a tactile response to a user.

The (digital) pen sensor 254, for example, may be implemented using a means identical or similar to a means for receiving a touch input from a user or using a separate recognition sheet. The key 256, for example, may include a physical button, an optical key, or a keypad. The ultrasonic input unit 258 is a unit that can identify data by generating an ultrasonic signal through an input tool and detecting a sonic wave through a microphone (e.g., the microphone 688) in the electronic device 600, and is capable of wireless recognition. According to an embodiment, the electronic device 200 may also receive a user input from an external device (e.g., computer or server) connected thereto by using the communication module 220.

The display 260 (e.g., the display 150) may include a panel 262, a hologram unit 264, or a projector 266. The panel 262, for example, may be a liquid crystal display (LCD) or an active matrix-organic light emitting diode (AM-OLED). The panel 262, for example, may be implemented to be flexible, transparent, or wearable. The panel 262 may also be incorporated into one module together with the touch panel 252. The hologram unit 264 may show a stereoscopic image in the air by using light interference. The projector 266 may display an image by projecting light onto a screen. The screen, for example, may be located inside or outside of the electronic device 200. According to various embodiments, the display 260 may further include a control circuit for controlling the panel 262, the hologram unit 264, or the projector 266.

The interface 270, for example, may include a high-definition multimedia interface (HDMI) 272, a universal serial bus (USB) 274, an optical interface 276, or a D-sub-miniature (D-sub) 278. The interface 270, for example, may be included in the communication interface 160 shown in FIG. 1. Additionally or alternatively, the interface 290, for example, may include a mobile high-definition link (MHL) interface, a secure digital (SD) card/multimedia card (MMC) interface, or an infrared data association (IrDA) interface.

The audio module 280 may provide bidirectional conversion between an audio/sound signal and an electronic signal. At least some elements of the audio module 280, for example, may be included in the input/output interface 140 shown in FIG. 1. The audio module 280, for example, may process sound information input or output through a speaker 282, a receiver 284, earphones 286, or the microphone 288.

The camera module 291 is a device that can take both still and moving images, and according to an embodiment, may include one or more image sensors (e.g., a front sensor or a rear sensor, not shown), a lens (not shown), an image signal processor (ISP) (not shown), or a flash (e.g., an LED or xenon lamp, not shown).

The power management module 295 may manage power of the electronic device 200. Although not shown, the power management module 295, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge, for example, may measure the residual capacity, charge in voltage, current, or temperature of the battery 296. The battery 296 may store or generate electricity, and may supply power to the electronic device 200 by using the stored or generated electricity. The battery 296, for example, may include a rechargeable battery or a solar battery.

The indicator 297 may display a specific status of the electronic device 200 or a part thereof (e.g., the AP 210), for example, a boot-up status, a message status, or a charging status. The motor 298 may convert an electrical signal into a mechanical vibration. Although not shown, the electronic device 200 may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device according to the present disclosure may be formed by one or more components, and the names of the corresponding elements may vary according to the type of the electronic device. The electronic device according to the present disclosure may include at least one of the above described elements, and may exclude some of the elements or further include other additional elements. Further, some of the elements of the electronic device according to the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future.

Figure 3:
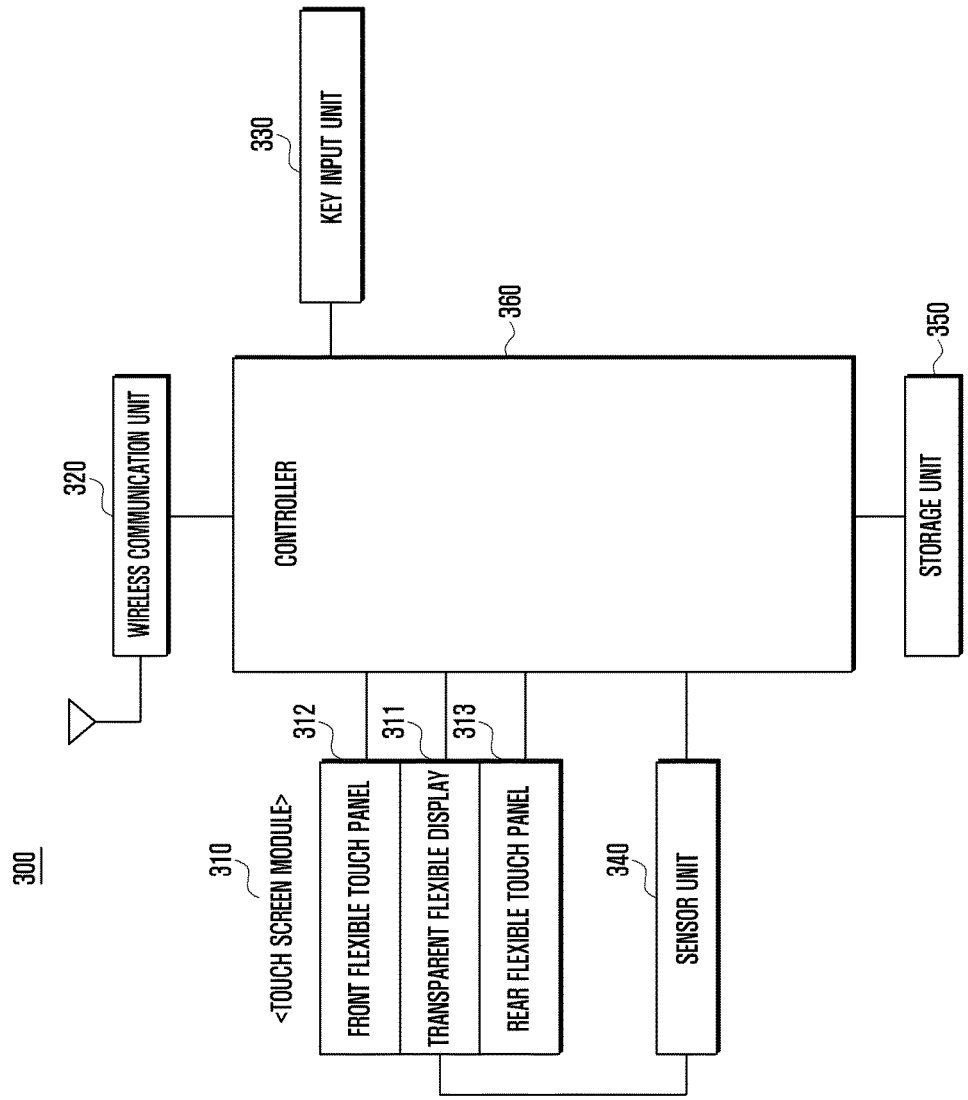
FIG. 3 is a schematic block diagram of an electronic device with a transparent flexible display according to embodiments of the present disclosure.

FIG. 3 is a schematic block diagram of an electronic device 300 with a transparent flexible display according to embodiments of the present disclosure.

Referring to FIG. 3, the electronic device 300 may include a touch screen module 310, a wireless communication unit 320, a key input unit 330, a sensor unit 340, a storage unit 350 and a controller 360.

The touch screen module 310 may include a transparent flexible display 311, a front flexible touch panel 312 and a rear flexible touch panel 313. The transparent flexible display 311 may be transparent in a part or all of the area. The transparent flexible display 311 may be flexible in a part or all of the area. The front flexible touch panel 312 may be located on the front of the transparent flexible display 311 or installed within the transparent flexible display 311. The rear flexible touch panel 313 may be located on the back (rear) of the transparent flexible display 311 or included within the transparent flexible display 311.

The wireless communication unit 320 (e.g., serving to perform the functions of the communication interface 160 shown in FIG. 1) may communicate with external devices. The wireless communication unit 320 may include at least one components in the communication module 220 shown in FIG. 2.

The key input unit 330 (e.g., serving to perform an input function of the input/output interface 140 shown in FIG. 1) may transfer user's input instructions or data to other components. The key input unit 330 may include the key 256 shown in FIG. 2.

The sensor unit 340 may detect information about deformation about the transparent flexible display 311 and transfer the information to the controller 360. The sensor unit 340 may include a plurality of sensors for detecting deformations that are installed within the transparent flexible display 311, detect deformations at corresponding locations, and transfer the detections to the controller 360. For example, the deformation detection sensors may be arranged in the form of grid in the transparent flexible display 311. It should be understood that the present disclosure is not limited to the arrangement form of the deformation detection sensors. When the transparent flexible display 311 is undergoing deformation, the distances vary between the deformation detection sensors. The deformation detection sensors create deformation information (e.g., voltage variations) corresponding to the distance variations respectively and transfer the deformation information to the controller 360. In various embodiments, the deformation detection sensors may be implemented in such a way that one deformation detection sheet is installed in the transparent flexible display 311. In various embodiments, one or both of the touch panels 312 and 313 may be implemented to serve as the deformation detection sensors. That is, the embodiments may not be equipped with the deformation detection sensors. In that case, the touch panels 312 and/or 313 may detect deformations of the transparent flexible display 311 and transfer the deformation detections to the controller 360. In various embodiments, the sensor unit 340 may include a plurality of magnets, a Hall sensor, and an electric circuit for converting magnetic variations by the Hall sensor into electric signals and transferring the electrical signals to the controller 360. The magnets and Hall sensor may each be installed to the touch screen module 310.

The sensor unit 340 may further include a pen sensor (e.g., the pen sensor 254 shown in FIG. 2). The pen sensor may be installed in the transparent flexible display 311 and detect a user's pen inputs. The pen sensors may be installed to the front and/or back of the transparent flexible display 311 and recognize a user's pen inputs.

The storage unit 350 may be a memory (e.g., the memory 230 shown in FIG. 2). The memory may include a built-in memory (e.g., 232 shown in FIG. 2) or an external memory (e.g., 234 shown in FIG. 2).

The controller 360 may control the signal flow between the components of the electronic device 300, process instructions and data stored in the memory 230, control the operations of the components according to the processed instructions and data, etc. The controller 360 may include a processor. For example, the controller 360 may receive deformation information from the sensor unit 340 and calculate the extent of folding (e.g., the number of folded layers) of the transparent flexible display 311 by using the deformation information. The controller 360 may control the display operations of the transparent flexible display 311 based on the extent of folding.

Figure 4:
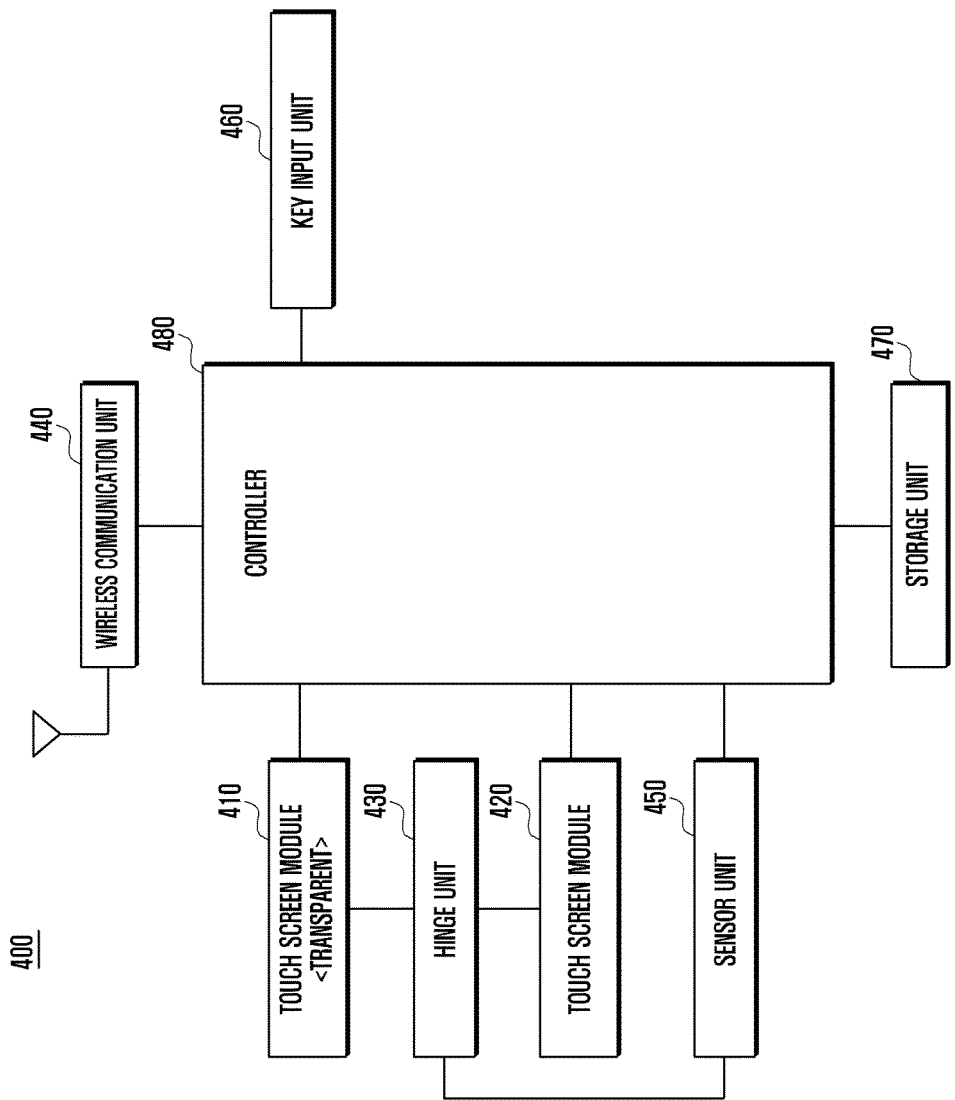
FIG. 4 is a schematic block diagram of an electronic device with a plurality of hard-type displays and a hinge unit according to embodiments of the present disclosure.

FIG. 4 is a schematic block diagram of an electronic device 400 with a plurality of hard-type displays and a hinge unit according to embodiments of the present disclosure.

Referring to FIG. 4, the electronic device 400 includes a transparent touch screen module 410, a touch screen module 420, a hinge unit 430, a wireless communication unit 440, a sensor unit 450, a key input unit 460, a storage unit 470 and a controller 480.

The transparent touch screen module 410 may be transparent in a part or all of the area. The transparent touch screen module 410 may include a hard-type transparent display, a front touch panel and a rear touch panel.

The touch screen module 420 may include a hard-type opaque (or transparent) display and a touch panel. The touch panel of the touch screen module 420 may be located on a screen of both faces of the display, which displays 'information,' in which the screen may refer to a face facing the transparent touch screen module 410 that forms layers with the touch screen module 420 as they are stacked. The touch panel of the touch screen module 420 may also be installed in the display.

The hinge unit 430 is a structure that enables the transparent touch screen module 410 to be folded or unfolded, in which the term 'folding' may refer to a state in which the transparent touch screen module 410 is located on the touch screen module 420 and 'unfolding' may refer to a state in which the transparent touch screen module 410 and the touch screen module 420 are located side by side, forming one flat layer.

The wireless communication unit 440 (e.g., serving to perform the functions of the communication interface 160 shown in FIG. 1) may communicate with external devices. The wireless communication unit 440 may include at least one of modules in the communication module 220 shown in FIG. 2.

The sensor unit 450 may detect the folding or unfolding of the transparent touch screen module 410 and transfer information corresponding to the detections to the controller 480. To do this, the sensor unit 450 may include, e.g., magnets, a Hall sensor for the magnets, and an electric circuit for converting magnetic variations of the Hall sensor into electric signals and transferring the electronic signals to the controller 480. The magnets and Hall sensor may each be installed to the transparent touch screen module 410 and the touch screen module 420, respectively. In various embodiments, the sensor unit 450 may include a plurality of sensors, for detecting deformations, which are installed within the transparent touch screen module 410 and the touch screen module 420, detect deformations at corresponding locations, and transfer the detections to the controller 480.

The sensor unit 450 may further include a pen sensor for recognizing inputs by a pen (e.g., the pen sensor 254 shown in FIG. 2).

The key input unit 460 may be identical in function and configuration to the key input unit 330 in FIG. 3. The storage unit 470 may be identical in function and configuration to the storage unit 350 in FIG. 3.

The controller 480 may include a processor to perform control operations and processing operations. For example, the controller 480 may receive electric signals from the electric circuit of the sensor unit 450, analyze the received electric signals, and calculate the extent of folding (e.g., the number of folded layers). For example, when a calculated value representing the extent of folding is greater than or equal to a first threshold, the controller 480 may determine that the transparent touch screen module 410 has been folded. When a calculated value is less than or equal to a second threshold (less than the first threshold), the controller may determine that the transparent touch screen module 410 has been unfolded. The controller 480 may control the display operations of the transparent touch screen module 410 and the touch screen module 420 based on the extent of folding.

In various embodiments, the transparent touch screen module 410 and the touch screen module 420 may be flexible.

In various embodiments, the transparent touch screen module 410 and the touch screen module 420 may be installed to both sides of the display. The transparent touch screen module 410 and the touch screen module 420 may include the hinge unit 430.

Figure 5:
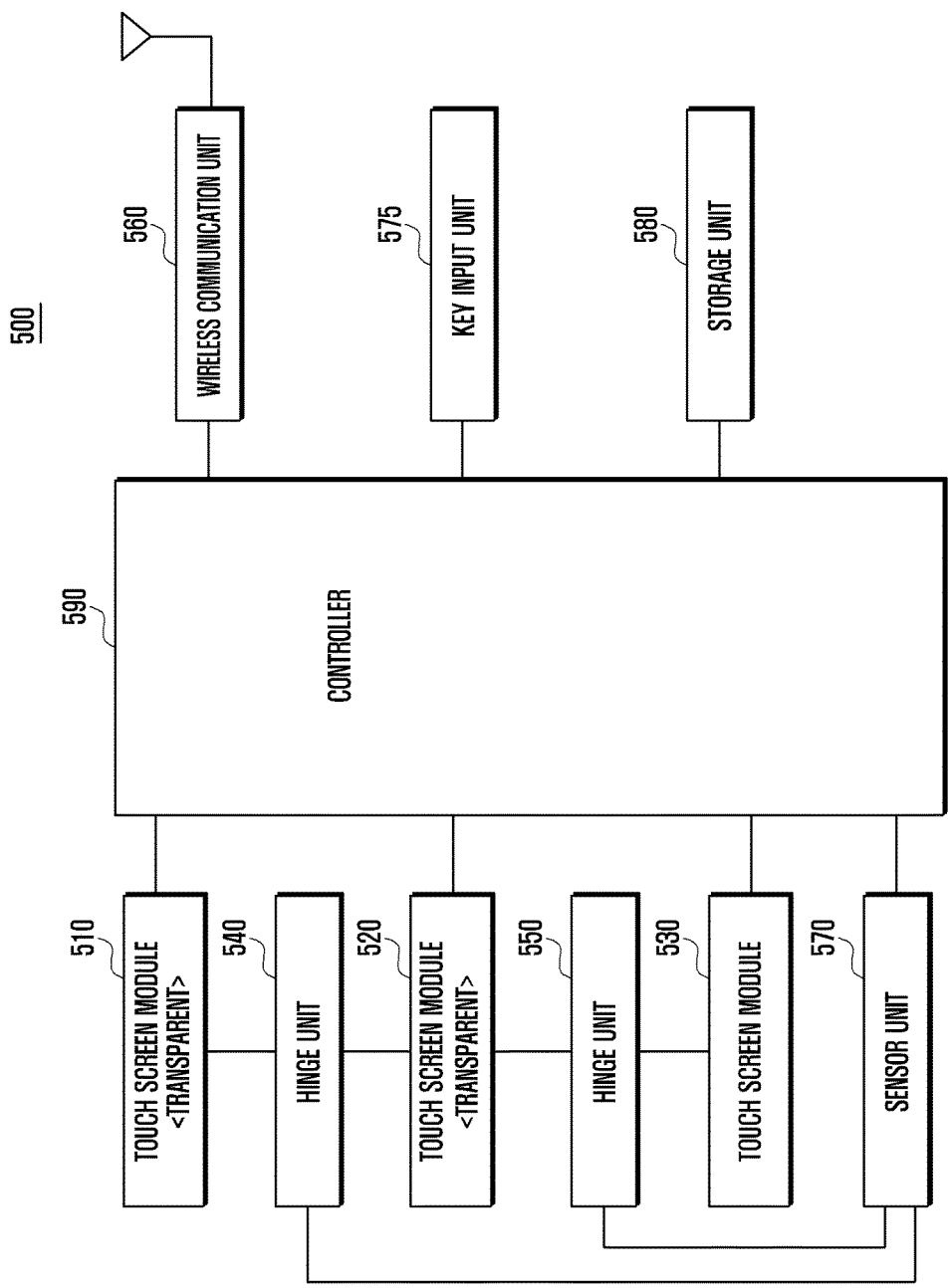
FIG. 5 is a schematic block diagram of an electronic device with a plurality of hard-type displays and a hinge unit according to embodiments of the present disclosure.

FIG. 5 is a schematic block diagram of an electronic device 500 with a plurality of hard-type displays and a hinge unit according to embodiments of the present disclosure.

Referring to FIG. 5, the electronic device 500 includes a transparent touch screen module 510, a transparent touch screen module 520, a touch screen module 530, a hinge unit 540, a hinge unit 550, a wireless communication unit 560, a sensor unit 570, a key input unit 575, a storage unit 580 and a controller 590.

The transparent touch screen modules 510 and 520 may each be transparent in a part or all of the area. The transparent touch screen modules 510 and 520 may each include a hard-type transparent display, a front touch panel and a rear touch panel. The touch screen module 530 may include a hard-type opaque (or transparent) display and a touch panel. The touch panel of the touch screen module 530 may be located on "screen displaying information" of both screens of the display. The touch panel of the touch screen module 530 may also be installed in the display.

The hinge unit 540 is a structure that enables the transparent touch screen module 510 to be folded or unfolded, in which the term 'folding' may refer to a state in which the transparent touch screen module 510 is located on the transparent touch screen module 520 and 'unfolding' may refer to a state in which the transparent touch screen modules 510 and 520 are located side by side, forming one flat layer.

The hinge unit 550 is a structure that enables the transparent touch screen module 520 to be folded or unfolded, in which the term 'folding' may refer to a state in which the transparent touch screen module 520 is located on the touch screen module 530 and 'unfolding' may refer to a state in which the transparent touch screen module 520 and the touch screen module 530 are located side by side, forming one flat layer.

The wireless communication unit 560 (e.g., serving to perform the functions of the communication interface 160 shown in FIG. 1) may communicate with external devices. The wireless communication unit 560 may include at least one of modules in the communication module 220 shown in FIG. 2.

The sensor unit 570 may detect the states of the transparent touch screen modules 510 and 520 and the touch screen module 530 and transfer information corresponding to the detections to the controller 590. To do this, the sensor unit 570 may include a plurality of magnets, a Hall sensor, and an electric circuit for converting magnetic variations of the Hall sensor into electric signals and transferring the electrical signals to the controller 590. The magnets and Hall sensor may each be installed to the touch screen modules 510, 520, and 530. The sensor unit 570 may further include a pen sensor for recognizing inputs by a pen (e.g., the pen sensor 254 shown in FIG. 2). In various embodiments, the sensor unit 570 may include a plurality of sensors for detecting deformations that each are installed within the touch screen modules 510, 520 and 530, detect deformations at corresponding locations, and transfer the detections to the controller 590.

The key input unit 575 may be identical in function and configuration to the key input unit 330 in FIG. 3. The storage unit 580 may be identical in function and configuration to the storage unit 350 in FIG. 3.

The controller 590 may include a processor to perform control operations and processing operations. For example, the controller 590 may receive electric signals from the electric circuit of the sensor unit 570, analyze the received electric signals, and calculate the extent of folding (e.g., the number of folded layers). For example, when a calculated value representing the extent of folding of the transparent touch screen module 510 is greater than or equal to a first threshold, the controller may determine that the transparent touch screen module 510 has been folded. When a calculated value is less than or equal to a second threshold, the controller may determine that the transparent touch screen module 510 has been unfolded. When a calculated value representing the extent of folding of the transparent touch screen module 520 is greater than or equal to a third threshold (that may be identical to the first threshold), the controller may determine that the transparent touch screen module 520 has been folded. When a calculated value is less than or equal to a fourth threshold (that may be identical to the second threshold and may be less than the third threshold), the controller may determine that the transparent touch screen module 520 has been unfolded. The controller 590 may control the display operations of the touch screen modules 510, 520 and 530 based on the extent of folding.

In various embodiments, the electronic device may include four or more touch screen modules and hinge units, N−1 (N denotes the number of touch screen modules), for folding and unfolding the touch screen modules. The bottom one of touch screen modules (farthest away from the user's eyes) may be opaque.

Figure 6B:
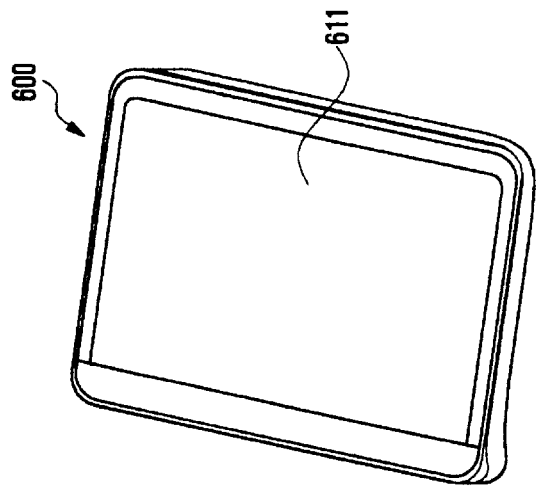
FIG. 6A and FIG. 6B illustrate views of showing states in which two parts or layers of one screen are unfolded forming one layer and folded forming two layers, according to embodiments of the present disclosure.
Figure 6A:
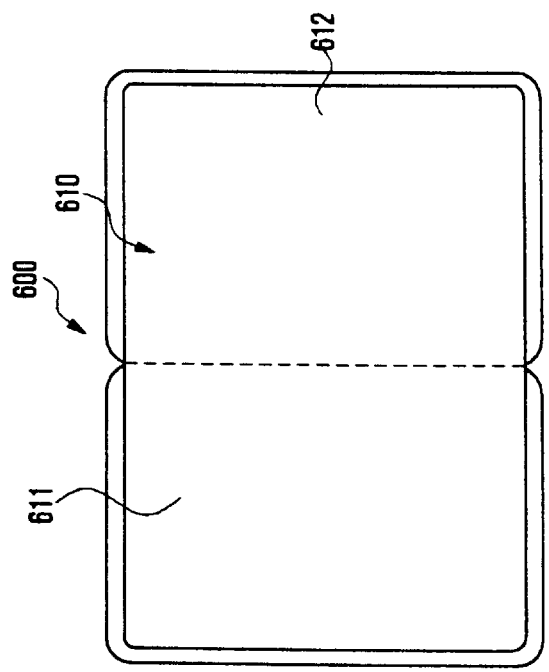

FIGS. 6A and 6B illustrate views of showing states in which two parts or layers of one screen are unfolded forming one layer and folded forming two layers, according to embodiments of the present disclosure.

Referring to FIG. 6A, the electronic device 600 (e.g., the electronic device 300 or 400 shown in FIGS. 3 and 4) may be in a state in which the display is unfolded. That is, the display may be unfolded to show the screen 610 as a full screen. Referring to FIG. 6B, the electronic device 600 may be in a state in which the display is folded. That is, one part 611 of the screen 610 may be located on the other part 612. As an example, one part 611 of the screen 600 may correspond to a screen on one transparent part of the touch screen module 310, and the other part 612 of the screen 600 may correspond to a screen on the other transparent (or opaque) part of the touch screen module 310. As another example, one part 611 of the screen 600 may correspond to a screen on one of both sides of the transparent touch screen module 410, and the other part 612 of the screen 600 may correspond to a screen on the touch screen module 420. As yet another example, one part 611 and the other part 612 of the screen 600 may be shown on the screen of the transparent touch screen module 410.

Figure 7B:
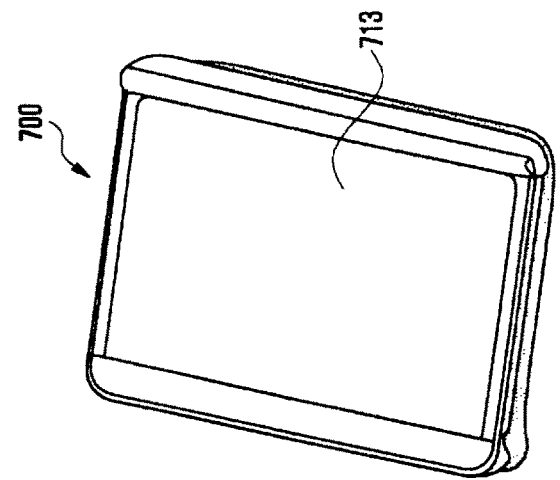
FIG. 7A and FIG. 7B illustrate views of showing states in which three parts or layers of one screen are unfolded forming one layer and folded forming three layers, according to embodiments of the present disclosure.
Figure 7A:
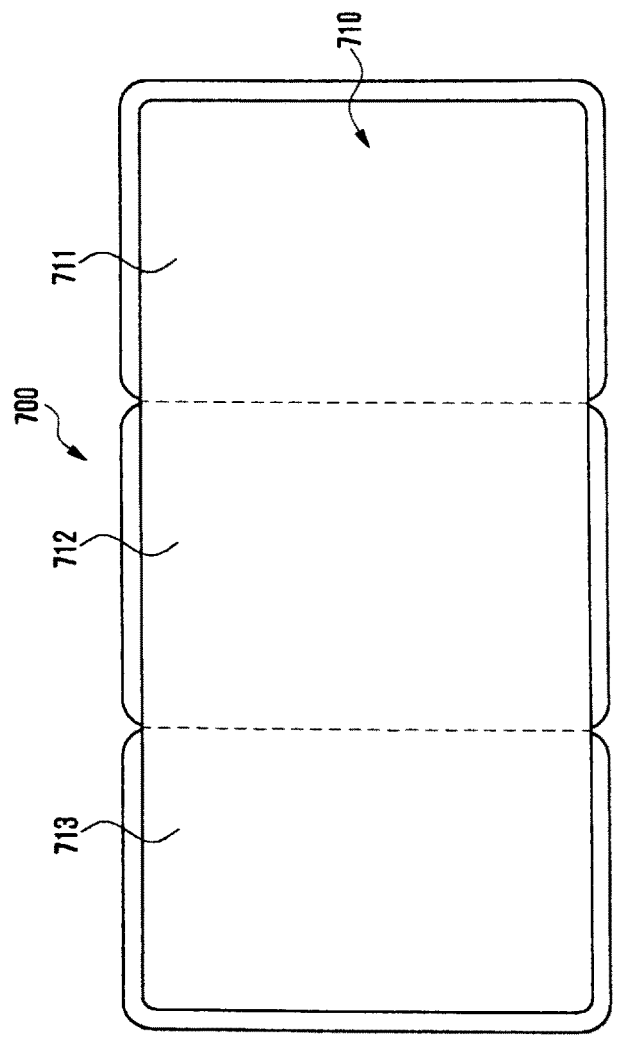

FIGS. 7A and 7B illustrate views of showing states in which three parts or layers of one screen are unfolded forming one layer and folded forming three layers, according to embodiments of the present disclosure.

Referring to FIG. 7A, the electronic device 700 (e.g., the electronic device 300 or 500 shown in FIGS. 3 and 5) may be in a state in which the display is unfolded. That is, the display may be unfolded to show the screen 710 as a full screen. Referring to FIG. 7B, the electronic device 700 may be in a state in which the display is folded in three layers. That is, one part 711 of the screen 710 may be located at the bottom of the three layers of the folded display; another part 712 may be located at the middle of the three layers; and the other part 713 may be located at the top of the three layers. As an example, one part 711 may correspond to a transparent (opaque) part of a screen of the touch screen module 310; another part 712 of the screen 700 may correspond to another transparent (opaque) part of the screen of the touch screen module 310; and the other part 713 may correspond to the other transparent part of the screen of the touch screen module 310. As another example, one part 711 of the screen 700 may correspond to a screen of the touch screen module 530; another part 712 may correspond to one of both sides of the transparent touch screen module 520; and the other part 713 may correspond to one of both sides of the transparent touch screen module 510.

Figure 8A:
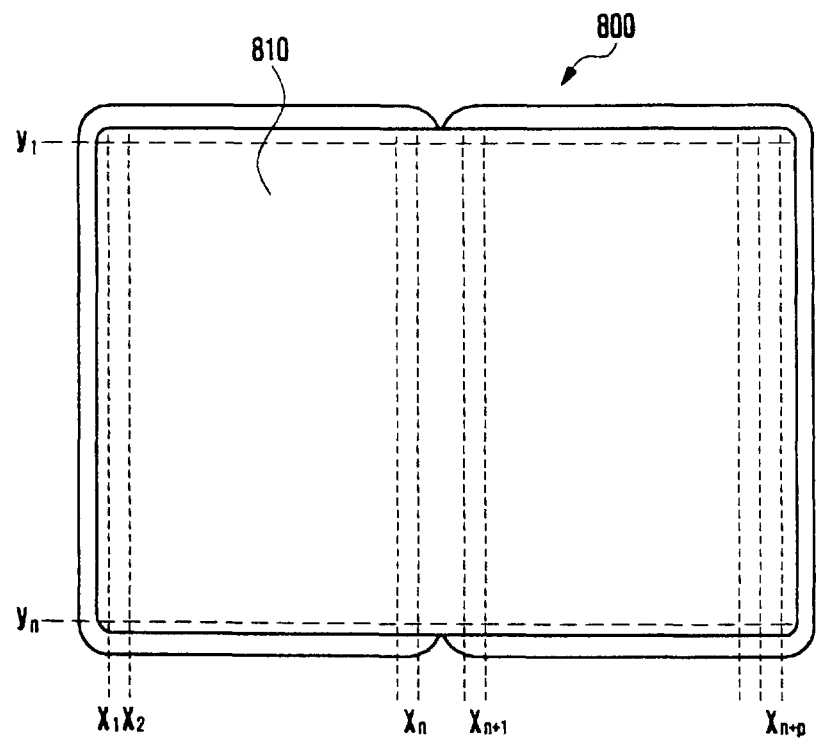
FIG. 8A and FIG. 8B illustrate views of showing an input area of a touch panel, according to embodiments of the present disclosure.
Figure 8B:
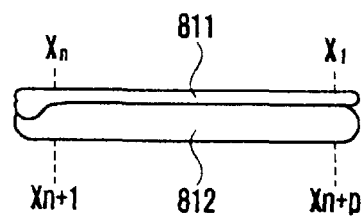

FIGS. 8A and 8B illustrate views of showing an input area of a touch panel, according to embodiments of the present disclosure.

Referring to FIG. 8A, the electronic device 800 (e.g., the electronic device 300 or 400 shown in FIGS. 3 and 4) may be in a state in which the display is unfolded. That is, the display may be unfolded to show the screen 810 as a full screen. In that case, the input area may be set to the entire area of the screen 810. For example, when the screen 810 is unfolded, the controller of the electronic device 800 may activate all scan ports $y_1 \sim y_n$ of the touch panel (e.g., transfer scan control signals to all scan ports) and also activate all detection ports $x_1 \sim x_{n+p}$ of the touch panel (e.g., receive detection signals from all detection ports). It should be understood that $x_1 \sim x_{n+p}$ may be set to scan ports and $y_1 \sim y_n$ may be set to detection ports.

Referring to FIG. 8B, the display may be folded so that the screen 810 forms two layers. In that case, the input area may be set to part or all of the entire area of the screen 810. For example, when the input area may be set to part of the entire area of the screen 810, the controller of the electronic device 800 may activate all scan ports $y_1 \sim y_n$ and detection ports $x_1 \sim x_n$, and deactivate detection ports $x_{n+1} \sim x_{n+p}$. That is, the upper layer 811 of the two layers may be set to an input area. Alternatively, the controller of the electronic device 800 may activate all scan ports $y_1 \sim y_n$ and detection ports $x_{n+1} \sim x_{n+p}$, and deactivate detection ports $x_1 \sim x_n$. That is, the lower layer 812 of the two layers may be set to an input area.

In various embodiments, the display of the electronic device may be folded so that the screen forms three layers. In that case, at least one of the three layers may be set to an input area (input areas).

FIGS. 9A to 9C illustrate views that describe an example of 'a process of altering an information attribute in an electronic device according to the present disclosure.

Referring to FIG. 9A, the electronic device 900 (e.g., the electronic device 300 or 500 shown in FIGS. 3 and 5) may be in a state in which the display is unfolded to show the screen 910 as a full screen. In that case, one part 911 of the screen 910 may display first information 920; another part 912 may display second information 930; and the other part 913 may display third information 940.

Referring to FIGS. 9B and 9C, the display may be folded so that the screen 910 is folded forming three layers: for example, one part 911 and another part 912 of the screen 910 may face each other, so that their front sides are facing each other inside; and the rear sides of the part 912 and the other part 913 may face each other, so that the front side of the other part 913 is facing outward. That is, parts/layers 911, 912 and 913 of the screen 910 may be located at the bottom, middle and top of the three layers, respectively. The part 911 at the bottom layer may be transparent or opaque. The parts/layers 912 and 913 at the middle and top layers respectively may be transparent. Therefore, when the screen 910 is folded in three layers, the user may identify part of information, 920, 930 and 940, on corresponding screen.

The controller of the electronic device 900 may alter the attribute of part of information (or simply the information) 920, 930 and 940 and may control the display to show the information with the altered attribute. For example, the information 930 may be displayed, revering right and left. Examples of the attributes to be altered may include size, display location (e.g., display coordinates), color, amount of displayed information (e.g., the amount in a folded sate is reduced, compared with an unfolded state), transparency, brightness, etc.

Figures 10A, 10B:
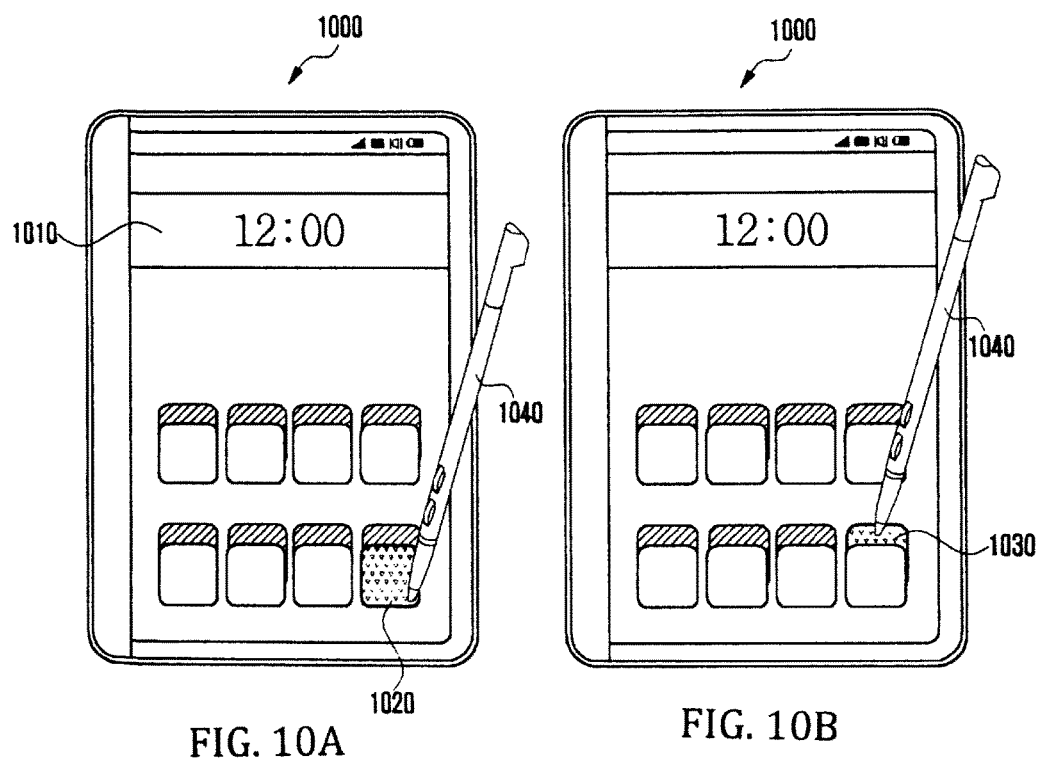
FIG. 10A and FIG. 10B illustrate views that describe an example of 'a process of highlighting a user's selected information' in an electronic device a according to the present disclosure.

FIGS. 10A and 10B illustrate views that describe an example of 'a process of highlighting a user's selected information' in an electronic device a according to the present disclosure.

Referring to FIGS. 10A and 10B, the electronic device 1000 (e.g., the electronic device 300, 400 or 500 shown in FIGS. 3 to 5) may be in a state in which the screen 1010 of the display is folded forming multilayers. In that case, the layered parts (or layers) of the screen 1010 may display corresponding information, respectively. For example, as shown in FIG. 10A, the top layer may display a first object 1020. As shown in FIG. 10B, the layer under the top may display a second object 1030. The objects 1020 and 1030 may each be icons, liker (e.g., linked hypertext), images, thumbnails, etc.

When the electronic device 1000 recognizes a user's input (e.g., an input by a pen 1040), it calculates coordinates of the input. When the electronic device 1000 detects an object has been at the coordinates, it may execute the corresponding function. For example, when the electronic device 1000 detects that the first object 1020 is selected, it may highlight the first object 1020. Similarly, when the electronic device 1000 detects that the second object 1030 is selected, it may highlight the second object 1030.

FIGS. 11A and 11B illustrate views that describe a first example of a process of setting an input area in an electronic device according to the present disclosure.

Referring to FIGS. 11A and 11B, the electronic device 1100 (e.g., the electronic device 300, 400 or 500 shown in FIGS. 3 to 5) may be in a state in which the screen is folded forming multilayers.

The electronic device 1100 may detect a touch input (e.g., a flick or a double tap) and may determine one of the layers, to which the touch input is applied, as a 'part for interaction with the user.' The 'part for interaction with the user' may refer to a portion or an input/output area that reacts in response to the user's input (or receives a user's input) and outputs (or displays) information corresponding to the user's input. As shown in FIG. 11A, when the electronic device 1100 detects a flick 1110 in the left direction, it may determine the upper layer as an input/output area. Similarly, although it is not shown, when the electronic device 1100 detects a flick in the right direction, it may determine the lower layer as an input/output area.

The electronic device 1100 may detect a key input and may determine one of the layers, to which the key input is applied, as a 'part for interaction with the user (or an input/output area).' For example, as shown in FIG. 11B, when the electronic device 1100 detects that the user's thumb 1120 presses the side key (not shown), it may determine the upper layer as an input/output area. When the electronic device 1100 detects that the side key is re-pressed, it may switch the input/output area from the upper layer to the lower layer.

Figure 12B:
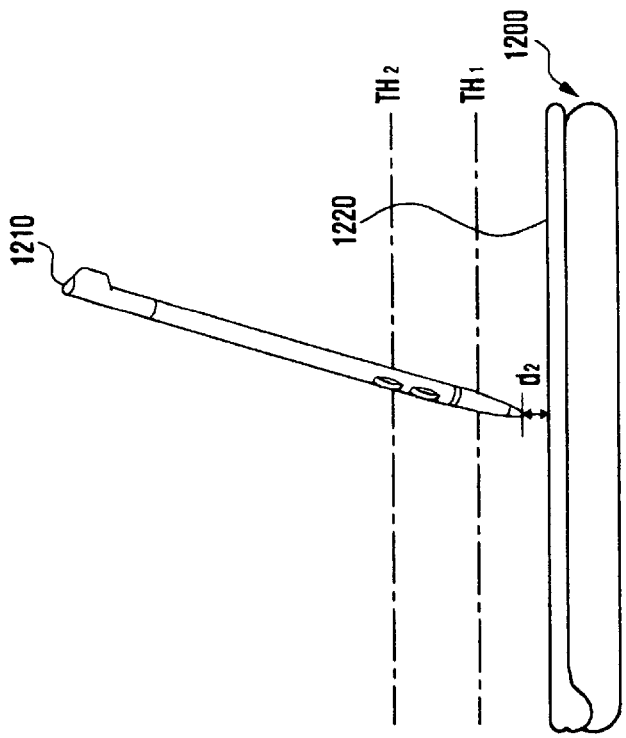
FIG. 12A and FIG. 12B illustrate views that describe a second example of a process of setting an input area in an electronic device according to the present disclosure.
Figure 12A:
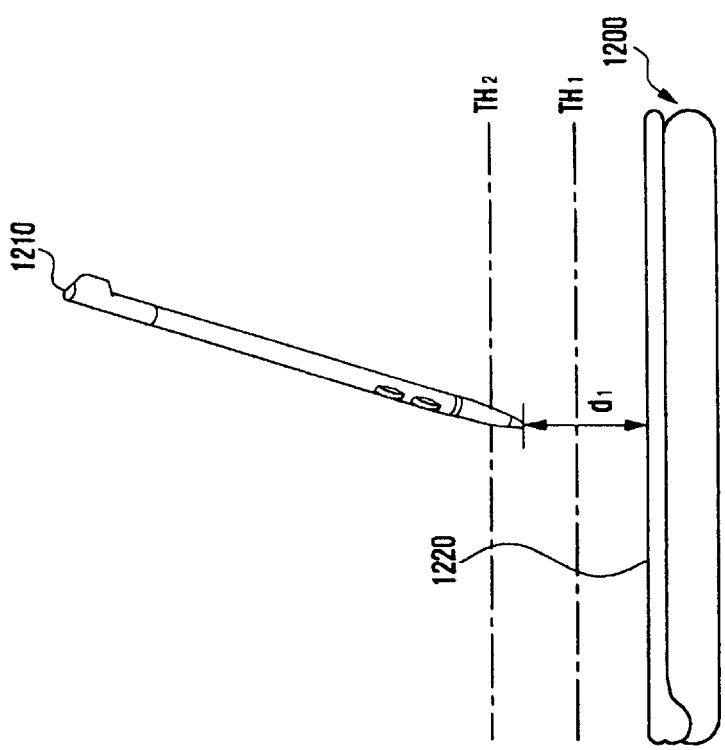

FIGS. 12A and 12B illustrate views that describe a second example of a process of setting an input area in an electronic device according to the present disclosure.

Referring to FIGS. 12A and 12B, the electronic device 1200 (e.g., the electronic device 300, 400, or 500 shown in FIGS. 3 to 5) may be in a state in which the screen is folded forming multilayers. The electronic device 1200 may detect an input tool (e.g., a pen 1210) above one of the layers of the screen (e.g., the top layer), the distance therebetween, and set the layer to a portion corresponding to the user's input based on the distance. For example, as shown in FIG. 12A, when the distance is $TH_1 < d_1 < TH_2$, the electronic device 1200 may determine the top layer as an input/output area. As shown in FIG. 12B, when the distance is $d_2 < TH_1$, the electronic device 1200 may determine the lower layer as an input/output area. $d_1$ and $d_2$ denote perpendicular distances between the pen 1210 and the surface of the screen 1220. $TH_1$ and $TH_2$ denote thresholds.

Figure 13B:
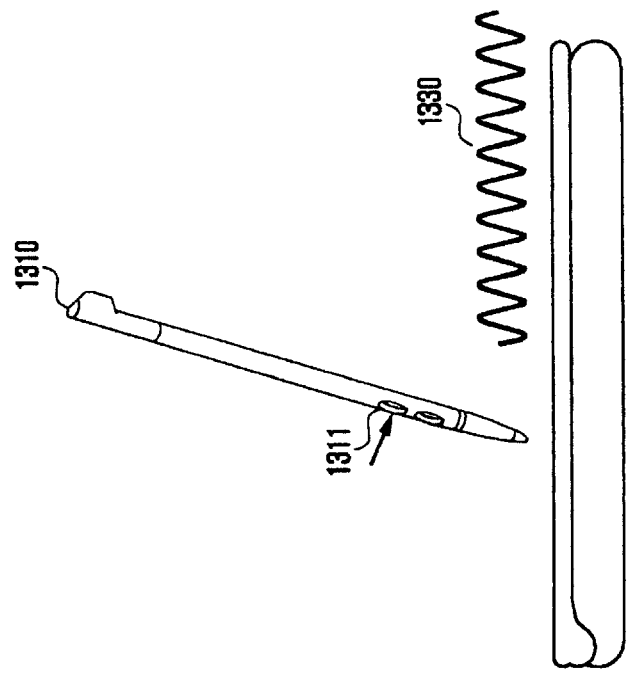
FIG. 13A and FIG. 13B illustrate views that describe a third example of a process of setting an input area in an electronic device according to the present disclosure.
Figure 13A:
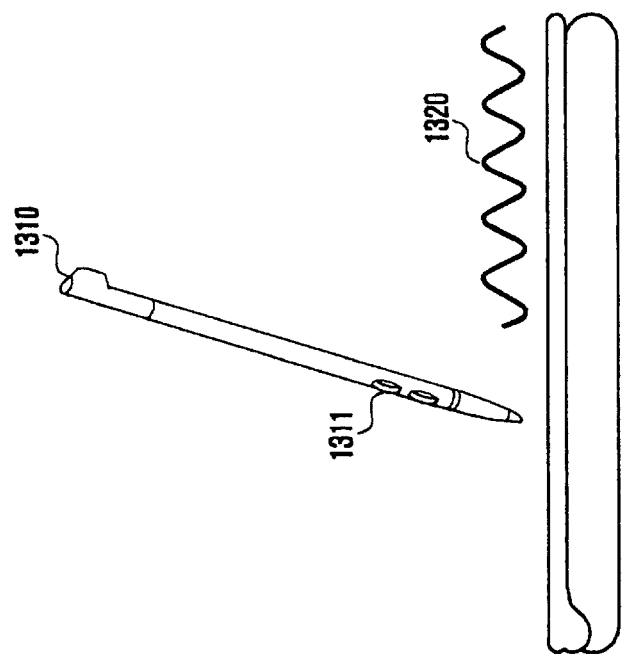

FIGS. 13A and 13B illustrate views that describe a third example of a process of setting an input area in an electronic device according to the present disclosure.

Referring to FIGS. 13A and 13B, the electronic device 1300 (e.g., the electronic device 300, 400, or 500 shown in FIGS. 3 to 5) may be in a state in which the screen is folded forming multilayers. The electronic device 1300 may recognize an input of a pen 1310. The pen 1310 may be equipped with a button 1311 and may transfer information corresponding to an input by the button 1311 (e.g., frequency) to the electronic device 1300. The electronic device 1300 may recognize the button input information. The electronic device 1300 may determine one of the layers of the screen as a portion corresponding to a user's input, based on the button's input information. In various embodiments, the pen 1310 may include a pressure sensor. The pen 1310 may transfer information corresponding to a level of pressure detected by the pressure sensor to the electronic device 1300. The electronic device 1300 may recognize the pressure information. The electronic device 1300 may determine one of the layers of the screen as a portion corresponding to a user's input, based on the pressure information of the pen 1310 (i.e., a level of pressure created when the user presses the screen with the point of the pen 1310).

As shown in FIG. 13A, when the user does not press the button 1311 of the pen 1310, the pen 1310 may transfer first frequency information 1320 to the electronic device 1300. In that case, the electronic device 1300 may determine the upper layer as an input/output area. As shown in FIG. 13B, when the user presses the button 1311, the pen 1310 may transfer second frequency information 1330 to the electronic device 1300. In that case, the electronic device 1300 may determine the lower layer as an input/output area.

It should be understood that the pen 1310 may also transfer other information to the electronic device 1300, besides the button's input information. For example, the pen 1310 may include a pressure sensor. When the user grips the pen 1310, it may create the pressure information by using the pressure sensor and transfer it to the electronic device 1300. The electronic device 1300 may determine one of the layers of the screen as a portion corresponding to a user's input, based on the pressure information from the pen 1310.

Figure 14C:
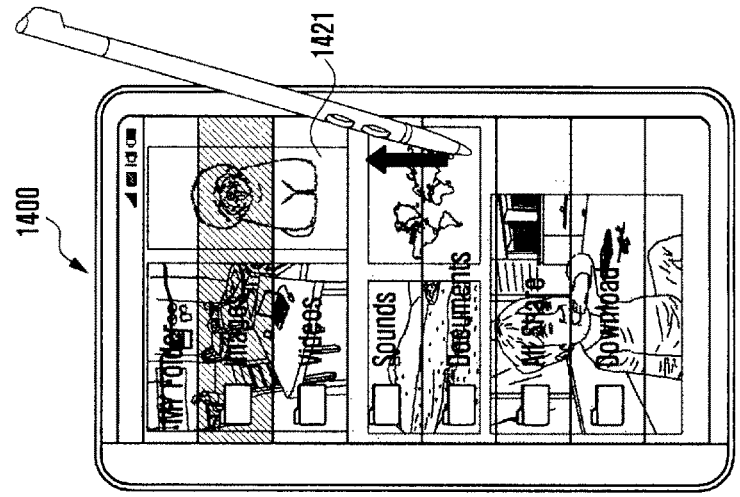
FIG. 14A, FIG. 14B and FIG. 14C illustrate views that describe an example of 'a process of displaying hierarchical information' in an electronic device according to the present disclosure.
Figure 14B:
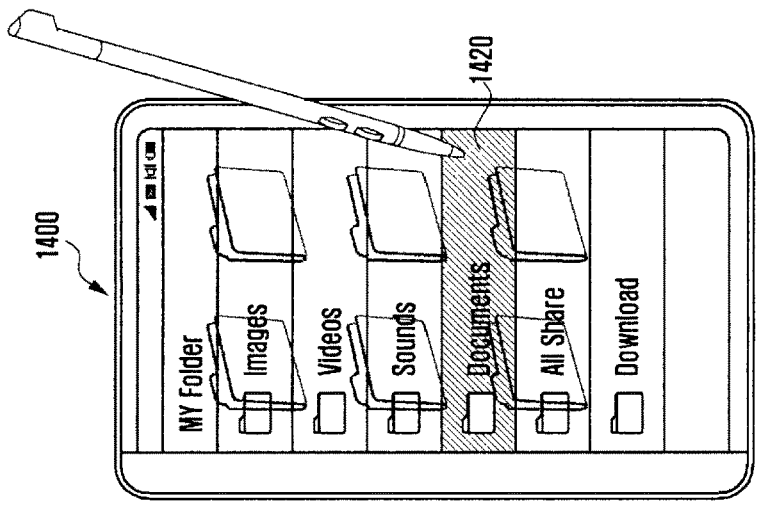
Figure 14A:
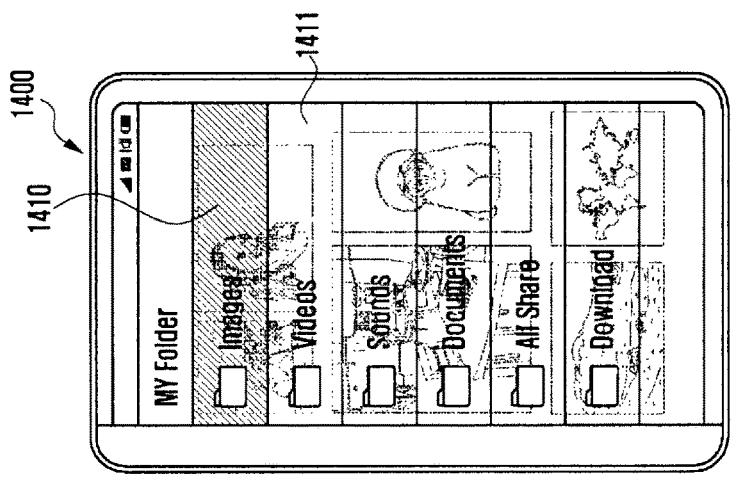

FIGS. 14A to 14C illustrate views that describe an example of 'a process of displaying hierarchical information' in an electronic device according to the present disclosure.

Referring to FIGS. 14A to 14C, the electronic device 1400 (e.g., the electronic device 300, 400, or 500 shown in FIGS. 3 to 5) may be in a state in which the screen is folded forming multilayers (e.g., two layers). In that case, one of the two layers may be an input/output area and the other layer may be an output area. For example, the upper layer may be an input/output area and the lower layer may be an output area.

As shown in FIG. 14A, the upper layer may display folders and the lower layer may display data 1411 included in one of the folders (e.g., images 1410), i.e., a sub-folder of the folder. When the selected folder is switched from Images 1410 to Documents 1420 as shown in FIG. 14B, the electronic device 1400 may highlight Documents 1420 and display data 1421 included in the Documents 1420 on the lower layer as shown in FIG. 14C.

Figures 15A, 15B:
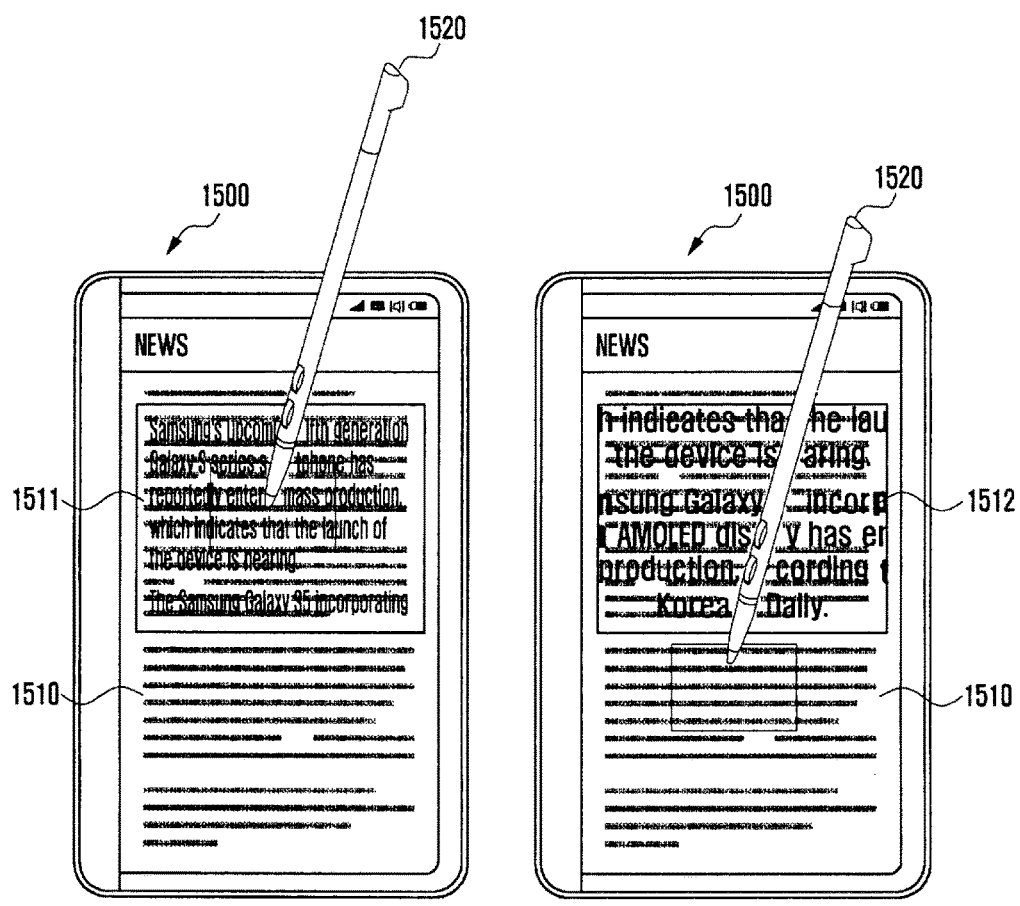
FIG. 15A and FIG. 15B illustrate views that describe an example of 'a process of enlarging and displaying information' in an electronic device according to the present disclosure.

FIGS. 15A and 15B illustrate views that describe an example of 'a process of enlarging and displaying information' in an electronic device according to the present disclosure.

Referring to FIGS. 15A and 15B, the electronic device 1500 (e.g., the electronic device 300, 400, or 500 shown in FIGS. 3 to 5) may be in a state in which the screen is folded forming multilayers (e.g., two layers). In that case, one of the two layers may be an input area and the other layer may be an output area. For example, the lower layer may be an input area. The upper layer may be an output area for outputting information in response to an input detected on the lower layer. As shown in FIG. 15A, the electronic device 1500 may display information (e.g., document 1510) on the lower layer. The electronic device 1500 may also enlarge part 1511 of the document 1510 and display it on the upper layer. When the electronic device 1500 detects a user's input (e.g., a drag down by a pen 1520), it may display the other part 1512 of the document 1510 on the lower layer.

Figure 16:
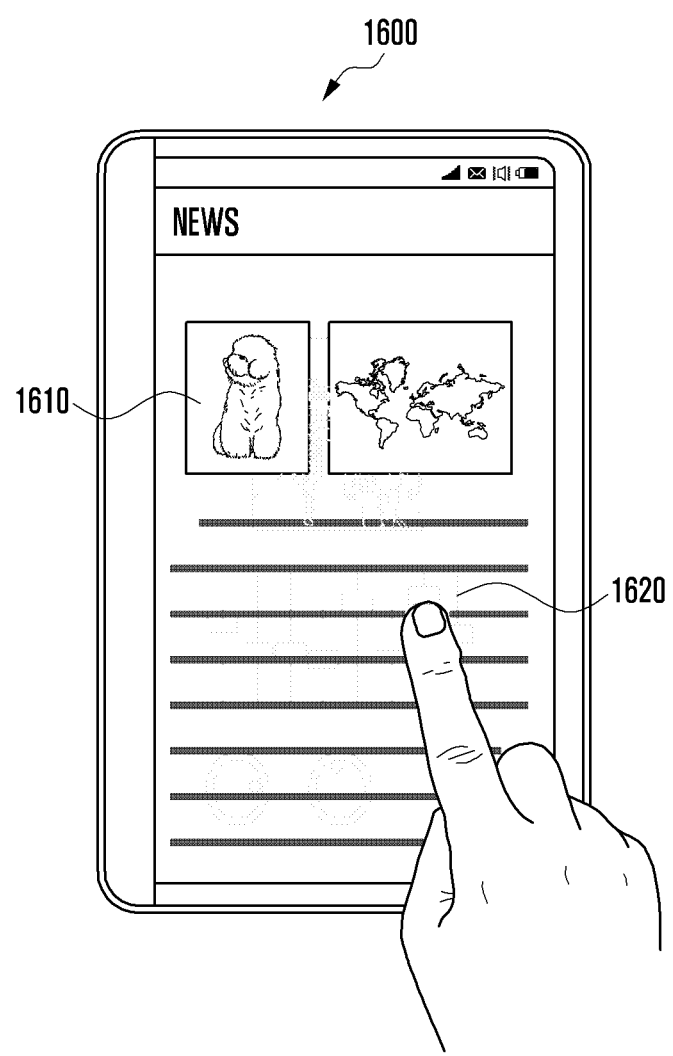
FIG. 16 illustrates a view that describes an example of 'a process of displaying application performing information' in an electronic device according to the present disclosure.

FIG. 16 illustrates a view that describes an example of 'a process of displaying application performing information' in an electronic device according to the present disclosure.

Referring to FIGS. 16A and 16B, the electronic device 1600 (e.g., the electronic device 300, 400, or 500 shown in FIGS. 3 to 5) may be in a state in which the screen is folded forming multilayers (e.g., two layers). In that case, the respective layers may display information about executed applications. For example, the electronic device 1600 may display a web browser 1610 on the upper layer and executed music application information 1620 on the lower layer.

Figure 17:
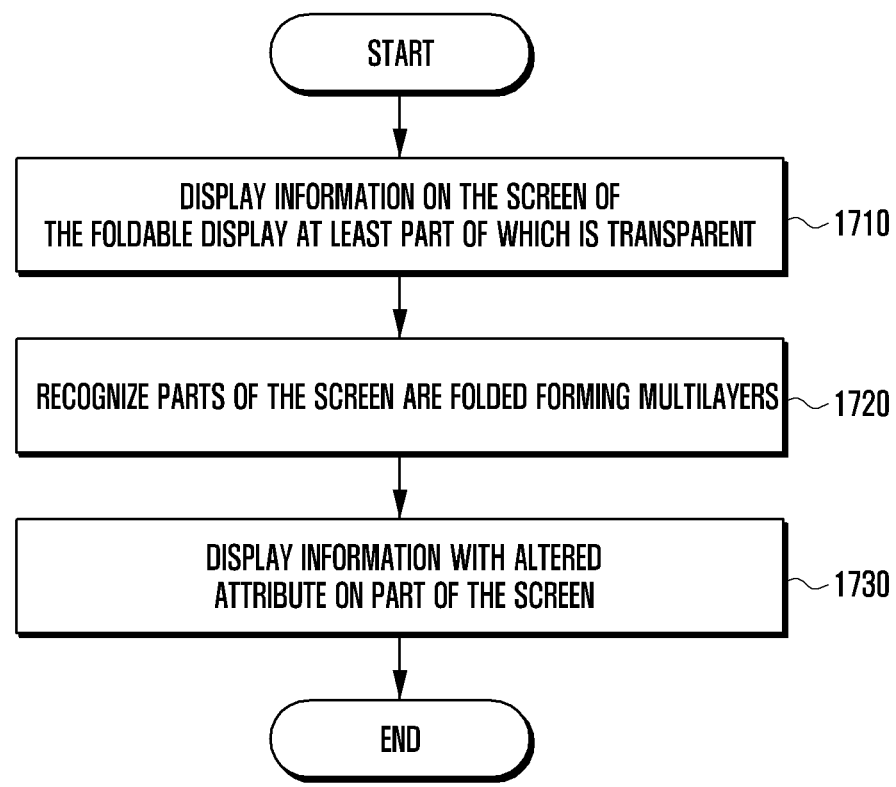
FIG. 17 is a flow chart that describes a first method of operating an electronic device with a foldable display at least part of which is transparent, according to embodiments of the present disclosure.

FIG. 17 is a flow chart that describes a first method of operating an electronic device with a foldable display at least part of which is transparent, according to embodiments of the present disclosure.

Figure 18:
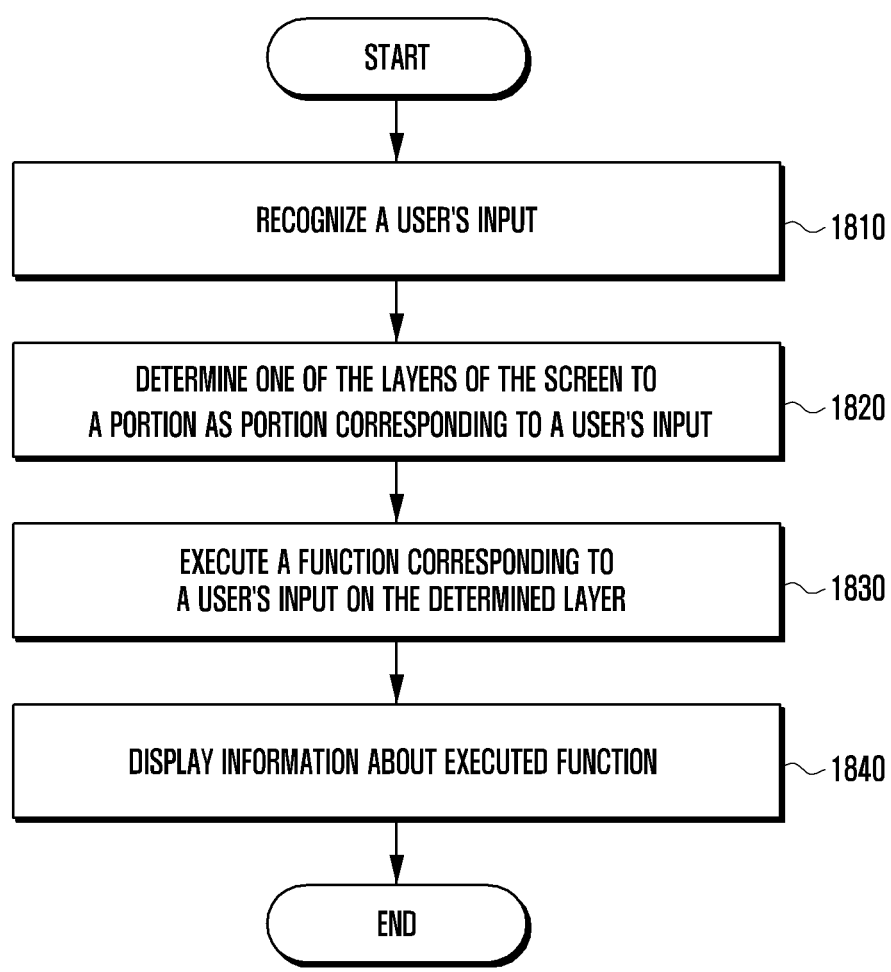
FIG. 18 is a flow chart that describes a second method of operating an electronic device with a foldable display at least part of which is transparent, according to embodiments of the present disclosure.

Referring to FIG. 17, the controller (e.g., controller 360, 480 or 590 shown in FIGS. 3 to 5) may control the foldable display part of which is transparent to display information on the screen, e.g., screen 910 shown in FIG. 9, (1710). The controller may recognize that the screen 910 is folded forming multilayers of parts, e.g., parts/layers of the screen 911, 912 and 913 as shown in FIG. 9B, (1720). The controller may alter attributes of information and control the display to show the information with the altered attribute (e.g., information 930 reversed right and left) on the part of the screen (1730). FIG. 18 is a flow chart that describes a second method of operating an electronic device with a foldable display at least part of which is transparent, according to embodiments of the present disclosure.

Referring to FIG. 18, the controller (e.g., controller 360, 480 or 590 shown in FIGS. 3 to 5) may recognize a user's input, e.g., an input by the pen 1040, a perpendicular distance between the pen 1210 and the screen 1220, or an input by the button of the pen 1310 (1810). The controller may determine one of the layers of the screen as a portion corresponding to a user's input (1820). The portion corresponding to a user's input may be an input area or an input/output area. The controller may execute a function corresponding to a user's input (e.g., highlighting, enlarging, etc.) on the determined layer (1830). The controller may control the display to display information about the executed function (1840). The information about the executed function may be displayed on a part that is determined as an output area or an input/output area.

Figure 19:
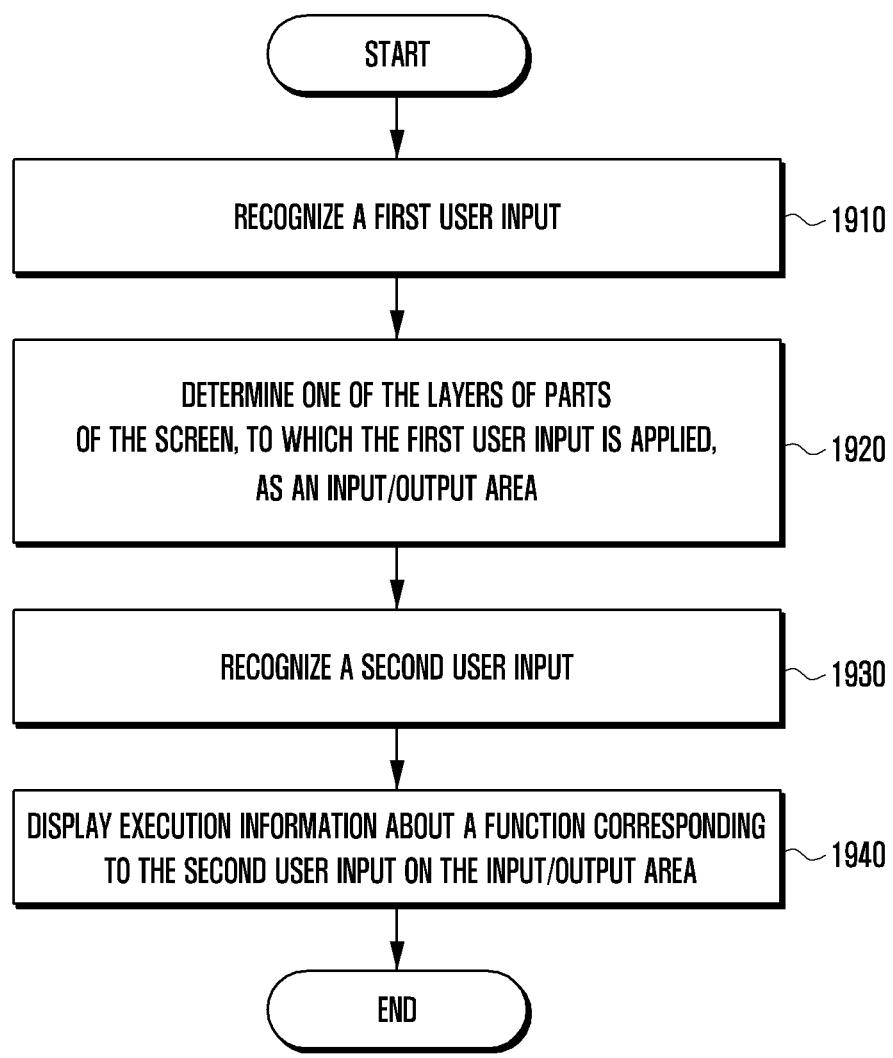
FIG. 19 is a flow chart that describes a third method of operating an electronic device with a foldable display at least part of which is transparent, according to embodiments of the present disclosure.

FIG. 19 is a flow chart that describes a third method of operating an electronic device with a foldable display at least part of which is transparent, according to embodiments of the present disclosure.

Referring to FIG. 19, the controller (e.g., controller 360, 480 or 590 shown in FIGS. 3 to 5) may recognize a first user input, e.g., a flick gesture 1110, an input of a side key pressed by the thumb 1120 (1910). The controller may determine one of the layers or parts of the screen, to which the first user input is applied, as a 'part for interaction with the user (or an input/output area)' (1920). The controller may recognize a second user input (1930). The controller may control the display to display execution information about a function corresponding to the second user input on the input/output area (1940).

Figure 20:
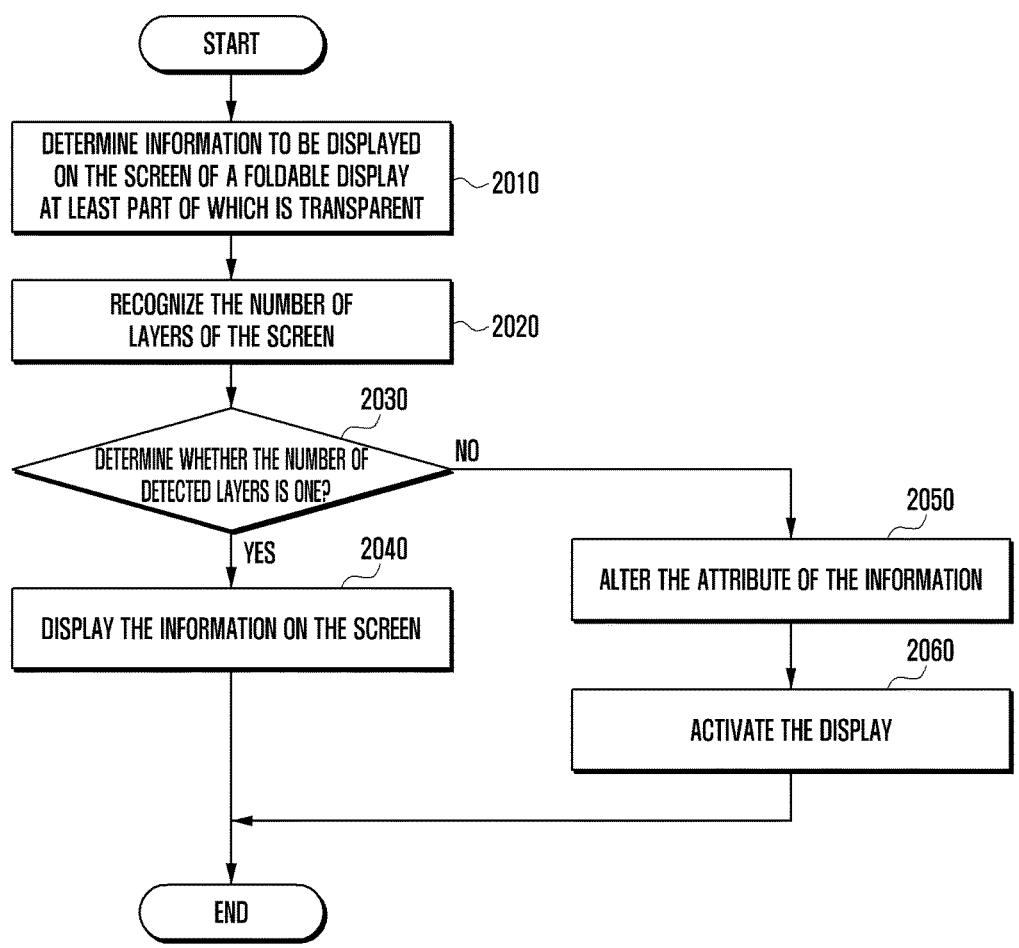
FIG. 20 is a flow chart that describes a fourth method of operating an electronic device with a foldable display at least part of which is transparent, according to embodiments of the present disclosure.

FIG. 20 is a flow chart that describes a fourth method of operating an electronic device with a foldable display at least part of which is transparent, according to embodiments of the present disclosure.

Referring to FIG. 20, the controller (e.g., controller 360, 480 or 590 shown in FIGS. 3 to 5) may determine information to be displayed on the screen of a foldable display at least part of which is transparent (2010). The controller may recognize the number of layers of the screen (2020). The controller may determine whether the number of recognized layers is one (2030). When the controller ascertains that the number of recognize layers is one in operation 2030, it may control the display to display the information on the screen (2040). When the controller ascertains that the number of recognized layers is two or more in operation 2030, it may alter the attribute of the information (2050). For example, the controller may divide the information to a plurality of pieces and may combine the pieces of information with each other to be displayed on different layers. The controller may control the activation of the display (2060). For example, the controller may control the display to show information with an altered attribute on one of the layers (e.g., the top layer). The controller may deactivate the other layers.

As described above, according to the embodiments of the present disclosure, the electronic devices may be equipped with a foldable display at least part of which is transparent so that users can easily operate them.

As described above, part of the method (e.g., operations) or system (e.g., modules or functions) according to the present disclosure can be implemented with instructions that can be conducted via various types of computers and stored in computer-readable storage media, as types of programming modules, for example. At least one processor (e.g., processor 201) can execute commend instructions, thereby performing the functions. An example of the computer-readable storage media may be memory 220. At least part of the programming modules can be implemented (executed) by processor 210, for example. At least part of the programming module includes modules, programs, routines, sets of instructions or processes, etc., for example, in order to perform at least one function.

Examples of computer-readable media include: magnetic media, such as hard disks, floppy disks, and magnetic tape; optical media such as CD-ROM disks and DVDs; magneto-optical media, such as floptical disks; and hardware devices that are specially configured to store and perform program instructions (programming modules), such as read-only memory (ROM), random access memory (RAM), flash memory, etc. Examples of program instructions include machine code, such as produced by a compiler, and files containing higher level code that may be executed by the computer using an interpreter. The described hardware devices may be configured to act as at least one software module in order to perform the operations and methods described above, or vice versa.

Modules or programming modules according to the present disclosure may include at least one of modules, remove part of the modules described above, or include new modules. The operations performed by modules, programming modules, or the other modules, according to the present disclosure, may be executed in serial, parallel, repetitive or heuristic fashion. Part of the operations can be executed in any other order, skipped, or executed with additional operations.

Although exemplary embodiments of the disclosure have been described in detail above, it should be understood that many variations and modifications of the basic inventive concept herein described, which may be apparent to those skilled in the art, will still fall within the spirit and scope of the exemplary embodiments of the disclosure as defined in the appended claims.

What is claimed is:

1. A method for an electronic device including a flexible display, comprising:
   displaying information on a screen of the flexible display;
   detecting whether the flexible display is physically folded into a plurality of physical layers in which a first physical layer of the flexible display physically overlaps a second physical layer of the flexible display such that content displayed on the second physical layer is visible through physical transparency of the first physical layer;
   altering an attribute of the displayed information in response to the detecting that the flexible display is folded into the plurality of physical layers; and
   displaying the information with the altered attribute on the flexible display that is folded into the plurality of physical layers, such that the information with the altered attribute is visible through the physical transparency of the flexible display as seen through the first physical layer.

2. The method of claim 1, wherein displaying the information with the altered attribute comprises:
   displaying the information with the altered attribute on at least one of the plurality of the layers of the screen.

3. The method of claim 2, wherein: the altering of the attribute of the information comprises reversing a portion of the information to generate a mirror image of the portion for display on the second physical layer when the flexible display is folded.

4. The method of claim 2, wherein:
   displaying the information with the altered attribute on at least one of the plurality of the layers of the screen comprises displaying the information with the altered attribute on an upper layer of the screen; and
   further comprising deactivating at least one of the other of the plurality of layers of the screen.

5. The method of claim 1, further comprising:
   detecting a user input to the first physical layer of the flexible display while the first physical layer overlaps the second physical layer of the display such that the content displayed on the second physical layer is visible through the first physical layer; and
   selecting at least one of the first physical layer and the overlapped second physical layer for alteration by the user input.

6. The method of claim 5, wherein:
   the user input comprises information indicating a distance between the screen and an input tool; and
   when the distance indicates the input tool is within a first threshold range from the screen, the first physical layer of the flexible display is selected for alteration by the user input; and
   when the distance indicates the input tool is within a second threshold range from the screen, the second physical layer of the flexible display is selected for alteration by the user input.

7. The method of claim 5, wherein:
   the user input is received from an input pen; and
   selecting one of the first physical layer and the overlapped second physical layer for alteration by the user input is based upon a characteristic of the user input received from the input pen.

8. The method of claim 7, wherein the characteristic includes at least one of:
   detecting of activation of a particular button of the input pen; and
   detecting a threshold level of pressure applied to the screen by the input pen.

9. The method of claim 5, further comprising:
   setting the selected one of the first physical layer and the second physical layer as an input area or an input/output area capable of receiving inputs; and
   setting at least one layer of the plurality of physical layers other than the selected one of the first physical layer and the second physical layer as an output area capable only of outputting information.

10. The method of claim 1, further comprising:
    recognizing a first user input;
    setting one of the plurality of the layers to which the first user input is applied as an input/output area;
    recognizing a second user input within the set input/output area; and
    displaying execution information for a function corresponding to the second user input within the set input/output area.

11. An electronic device comprising:
    a flexible display;
    a sensor unit; and
    a processor configured to:
    control the flexible display to display information on a screen;
    detected, via information received from the sensor unit, whether the flexible display is physically folded into a plurality of layers in which a first physical layer of the flexible display physically overlaps a second physical layer of the flexible display such that content displayed on the first physical layer is visible through physical transparency of the second physical layer;
    alter an attribute of the displayed information in response to detecting that the flexible display is physically folded into the plurality of physical layers; and
    display the information with the altered attribute on the flexible display that is folded into the plurality of physical layers, such that the information with the altered attribute is visible through the physical transparency of the flexible display as seen through the second physical layer.

12. The electronic device of claim 11, wherein: the altered attribute comprises reversing a portion of the information to generate a mirror image of the portion for display on the second physical layer when the flexible display is folded.

13. The electronic device of claim 11, further comprising:
    at least one hinge unit, wherein the display is configured to be folded into the plurality of layers utilizing the at least one hinge unit.

14. The electronic device of claim 11, wherein the processor is configured to control to display the information with the altered attribute on at least one of the plurality of layers.

15. The electronic device of claim 11, wherein the processor is configured to control to display the information with the altered attribute on an upper layer and deactivate a plurality of other layers.

16. The electronic device of claim 11, wherein the processor is further configured to:
- detect a user input to the first physical layer of the flexible display while the first physical layer overlaps the second physical layer of the display such that the content displayed on the second physical layer is visible through the first physical layer, and
- select at least one of the first physical layer and the overlapped second physical layer for alteration by the user input.

17. The electronic device of claim 16, wherein the processor is configured to set the selected one of the first physical layer and the overlapped second physical layer as an input area or an input/output area capable of receiving inputs, and
- set at least one layer of the plurality of physical layers other than the selected one of the first physical layer and the second physical layer as an output area capable only of outputting information.

18. The electronic device of claim 11, further comprising:
- a touch panel coupled with the display, wherein the processor is configured to
- detect a first user input through the touch panel, set one of the plurality of the layers to which the first user input is applied as an input/output area, recognize a second user input within the set input/output area, and control the display to display execution information for a function corresponding to the second user input within the set input/output area.

19. A tangible non-transitory computer-readable recording medium, storing program instructions executable by a computer processor to:
- display information on a screen of a flexible display;
- detect whether the flexible display is physically folded into a plurality of layers in which a first physical layer of the flexible display overlaps a second physical layer of the flexible display, such that content displayed on the second physical layer is visible through physical transparency of the first physical layer;
- alter an attribute of the displayed information in response to detecting that the flexible display is physically folded into the plurality of physical layers; and
- display the information with the altered attribute on the flexible display that is folded into the plurality of physical layers, such that the information with the altered attribute is visible through the physical transparency of the flexible display as seen through the first physical layer.

* * * * *